US011701796B2

(12) United States Patent
Fix et al.

(10) Patent No.: US 11,701,796 B2
(45) Date of Patent: Jul. 18, 2023

(54) DEMOLDING

(71) Applicant: THE BOEING COMPANY, Chicago, IL (US)

(72) Inventors: Courtney Michele Fix, Burien, WA (US); Robert Wayne Murray, Kirkland, WA (US); Paul Diep, Bothell, WA (US); Robert E. Lee, Lake Stevens, WA (US); Richard A. Skilton, Bothell, WA (US); Ronald Leroy McGhee, Lynnwood, WA (US); Zachary Nathaniel Stoddard, Mukilteo, WA (US); Patrick B. Stone, Monroe, WA (US); Phillip Andrew Taylor, Salt Lake City, UT (US); Nickolas Scott Ellerbeck, Cottonwood Heights, UT (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 17/526,718

(22) Filed: Nov. 15, 2021

(65) Prior Publication Data
US 2022/0193958 A1 Jun. 23, 2022

Related U.S. Application Data

(60) Provisional application No. 63/126,613, filed on Dec. 17, 2020.

(51) Int. Cl.
B29C 33/48 (2006.01)
B64C 1/06 (2006.01)
(Continued)

(52) U.S. Cl.
CPC ............ B29C 33/485 (2013.01); B29C 33/44 (2013.01); B29C 37/0003 (2013.01); B64C 1/064 (2013.01); B29L 2031/3082 (2013.01)

(58) Field of Classification Search
CPC ........ B29C 33/44; B29C 70/32; B29C 70/545
See application file for complete search history.

(56) References Cited

U.S. PATENT DOCUMENTS

2019/0317482 A1* 10/2019 Stone .................... B25B 5/14
2019/0389151 A1 12/2019 Klincik et al.

FOREIGN PATENT DOCUMENTS

EP 2151312 A1 2/2010
EP 3552773 A1 10/2019

OTHER PUBLICATIONS

Extended European Search Report for Application No. 21196383.0 dated Mar. 14, 2022, pp. 1-10.

* cited by examiner

Primary Examiner — Galen H Hauth
(74) Attorney, Agent, or Firm — Moore IP Law

(57) ABSTRACT

A system includes a mandrel contoured to define a tapering tubular shape of a workpiece cured on the mandrel and a demolding tool. The demolding tool is configured to remove the workpiece from the mandrel after the workpiece is cured on the mandrel and cut longitudinally. The demolding tool is configured to remove the workpiece from the mandrel by deforming a first end of the workpiece to at least partially disengage the first end of the workpiece from a first end of the mandrel, and subsequently, deforming a second end of the workpiece to at least partially disengage the second end of the workpiece from a second end of the mandrel. The first end of the workpiece may have a first cross-sectional area that is smaller than a second cross-sectional area of the second end of the workpiece.

24 Claims, 19 Drawing Sheets

(51) Int. Cl.
*B29C 33/44* (2006.01)
*B29C 37/00* (2006.01)
*B29L 31/30* (2006.01)

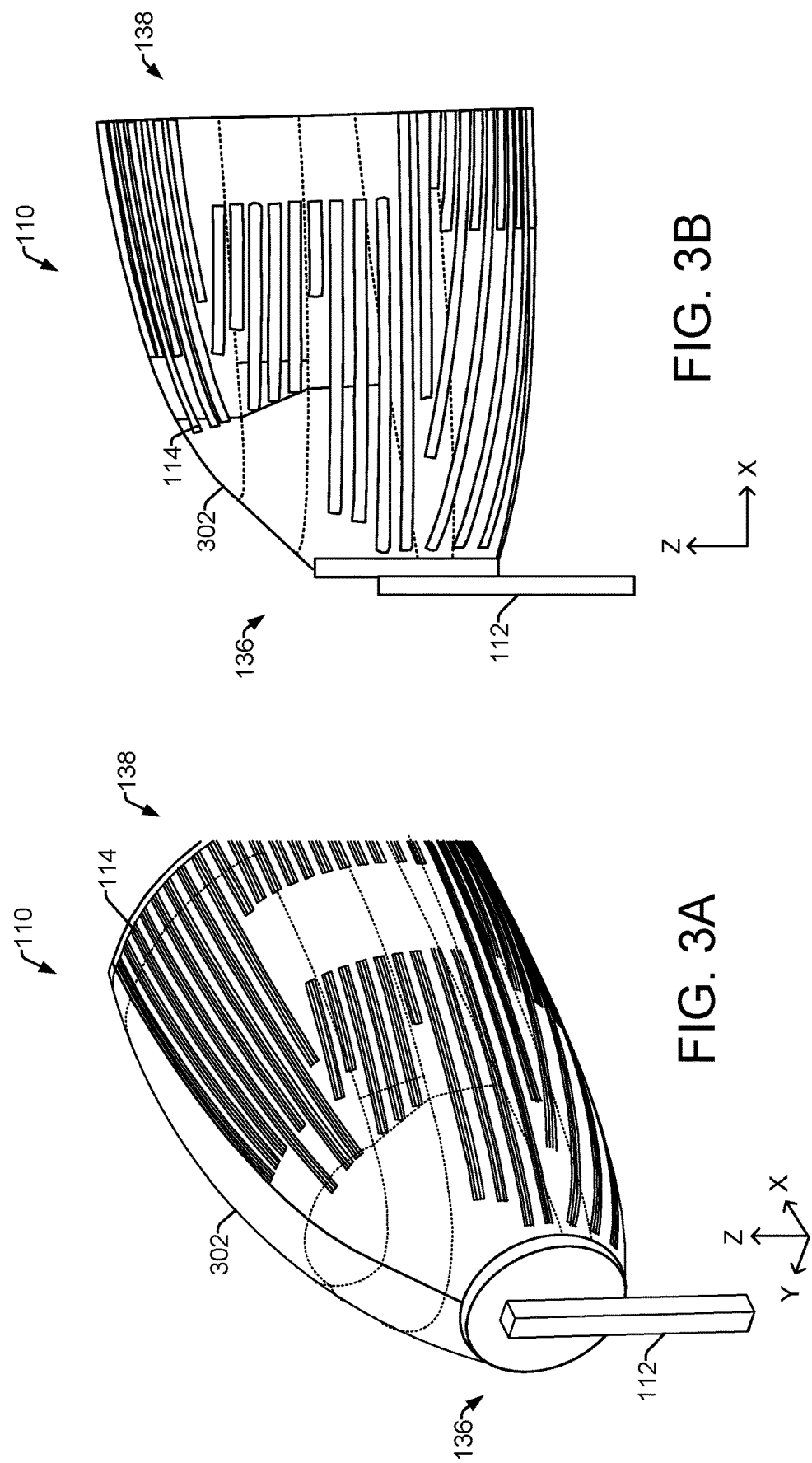

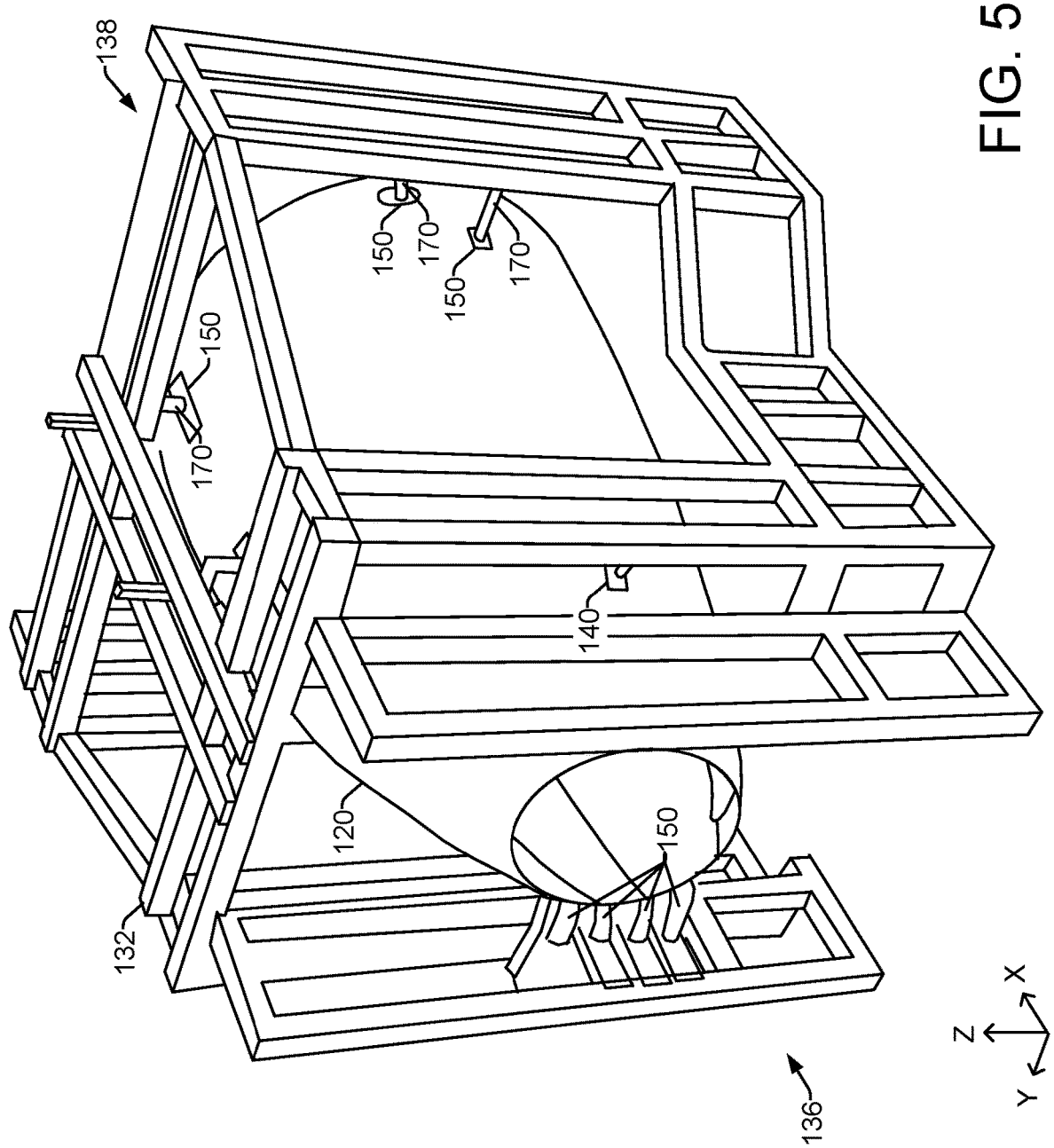

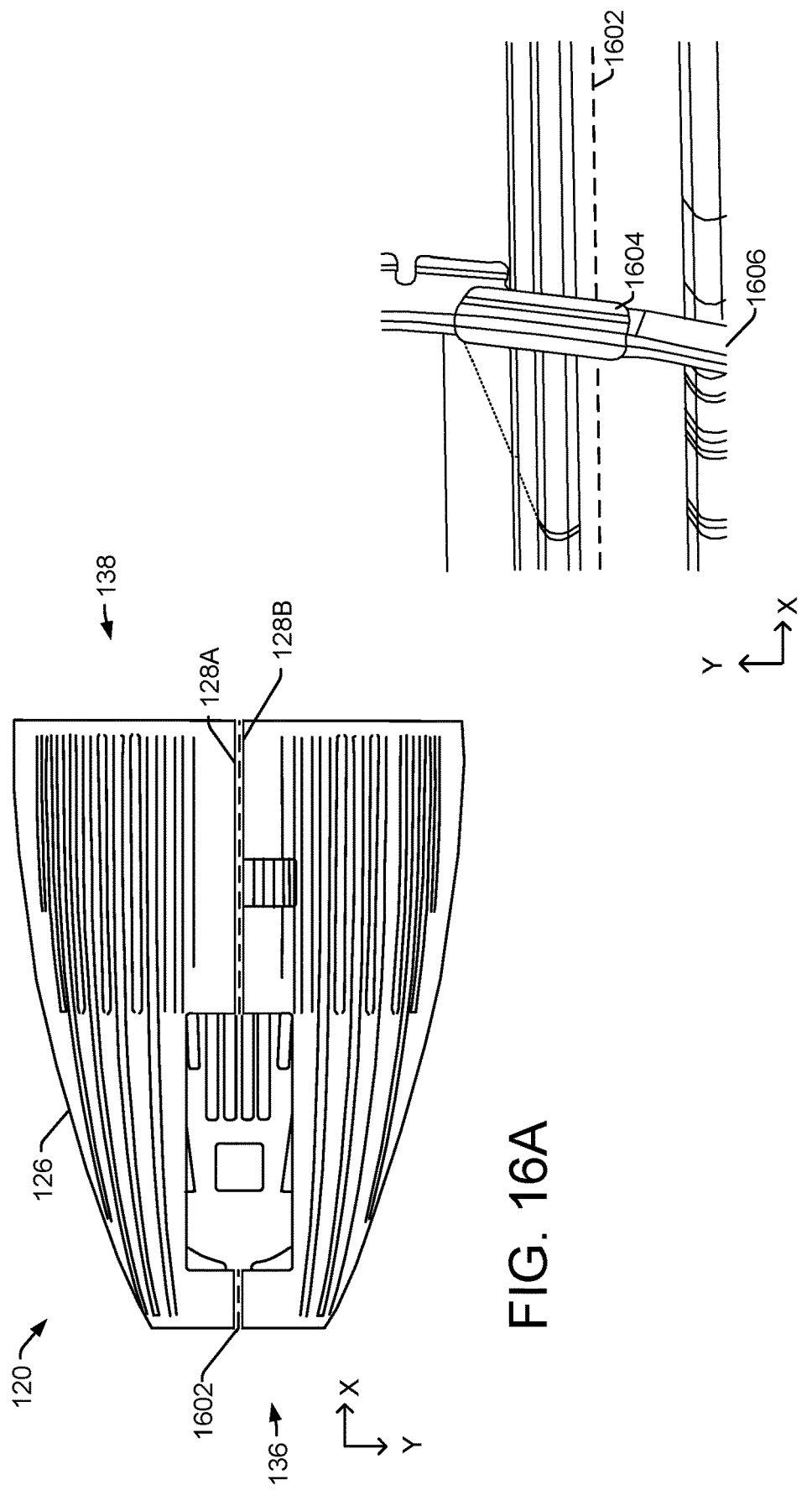

DEMOLDING

CROSS-REFERENCE TO RELATED APPLICATIONS

This application claims the benefit of U.S. Provisional Application No. 63/126,613, filed Dec. 17, 2020, and entitled "DEMOLDING," which is incorporated herein by reference.

FIELD OF THE DISCLOSURE

The present disclosure is generally related to demolding tools and methods.

BACKGROUND

Mandrels are often used to shape composite materials during manufacturing. For example, a mandrel may be used to define the shape of the composite materials during layup and curing. In some circumstances, it can be challenging to remove the composite materials from the mandrel after curing. To illustrate, when cured composite parts have certain shapes, there may be no simple way to pull the composite parts off of the mandrel without risking damage to the part, the mandrel, or both. For example, when a composite part fully encircles at least a portion of the mandrel, it can be challenging to remove the composite part from the mandrel.

Sometimes a breakdown mandrel is used to facilitate removal of a composite part from a mandrel without damaging the part or the mandrel. A breakdown mandrel includes several pieces that are assembled together to define the shape of the mandrel before composite materials are applied to the mandrel. After curing the composite materials, the mandrel is at least partially disassembled (e.g., one or more of the pieces of the mandrel are removed) to separate the cured composite part from the mandrel.

A breakdown mandrel is significantly more difficult to design and manufacture than a unitary or single-piece mandrel of the same size and shape and is therefore also significantly more expensive. Additionally, using a breakdown mandrel can increase fabrication times because the breakdown mandrel has to be disassembled, cleaned, and reassembled for each use whereas a unitary mandrel is ready for reuse after cleaning. Ill-fitting pieces, improper cleaning, or mis-assembly of the breakdown mandrel can also lead to defects in the composite part, which may require the composite part to be scrapped or reworked.

Another approach that may be used to remove a composite part from a mandrel is to cut the composite part into two or more pieces, and then reassemble the pieces. The pieces are subsequently joined together using two or more splice joints. Making each splice joint is time consuming, leading to higher manufacturing costs. Additionally, each splice joint adds additional weight to the composite part, which may be problematic when the final weight of the composite part is an important consideration, such as when the composite part is an aircraft component.

SUMMARY

In a particular implementation, a demolding tool includes a first plurality of couplers arranged to couple to a first end of a workpiece disposed on a mandrel. The mandrel includes a first end disposed adjacent to the first end of the workpiece and a second end disposed adjacent to a second end of the workpiece. The first end of the mandrel has a first cross-sectional area that is smaller than a second cross-sectional area of the second end of the mandrel. The demolding tool also includes a first plurality of actuators. Each actuator of the first plurality of actuators is coupled to at least one of the first plurality of couplers. The demolding tool further includes a second plurality of couplers arranged to couple to the workpiece at locations between the first end of the workpiece and the second end of the workpiece. The demolding tool also includes a second plurality of actuators. Each actuator of the second plurality of actuators is coupled to at least one of the second plurality of couplers. The demolding tool further includes a controller configured to, after a cut is formed in the workpiece along a longitudinal direction between the first end and the second end of the workpiece, cause the first plurality of actuators to apply, via the first plurality of couplers, first forces to the workpiece to deform the workpiece and at least partially disengage the first end of the workpiece from the first end of the mandrel. The controller is also configured to, after causing the first plurality of actuators to apply the first forces to the workpiece, cause the second plurality of actuators to apply, via the second plurality of couplers, second forces to the workpiece to further deform the workpiece and at least partially disengage the second end of the workpiece from the mandrel.

In another particular implementation, a method of removing from a mandrel a workpiece having a tubular shape defining a plurality of unequal circumferences spaced apart along a longitudinal axis is disclosed. The method includes, after the workpiece is cured on the mandrel, cutting the workpiece along a direction between a first end of the workpiece and a second end of the workpiece. The first end of the workpiece has a first circumference that is smaller than a second circumference of the second end of the workpiece. The method also includes applying first forces to the first end of the workpiece to deform the first end of the workpiece to at least partially disengage the first end of the workpiece from the first end of the mandrel. The method further includes, after applying the first forces, applying second forces to the second end of the workpiece to further deform the workpiece and at least partially disengage the second end of the workpiece from the mandrel.

In another particular implementation, a system includes a mandrel and a demolding tool. The mandrel is contoured to define a tapering tubular shape of a workpiece cured on the mandrel. The demolding tool is configured to remove the workpiece from the mandrel after the workpiece is cured on the mandrel and cut longitudinally. The demolding tool is configured to remove the workpiece from the mandrel by deforming a first end of the workpiece to at least partially disengage the first end of the workpiece from a first end of the mandrel, and subsequently, deforming a second end of the workpiece to at least partially disengage the second end of the workpiece from a second end of the mandrel. The first end of the workpiece has a first cross-sectional area that is smaller than a second cross-sectional area of the second end of the workpiece.

In yet another particular implementation, a method of removing a workpiece from a mandrel includes applying forces to the workpiece while cutting the workpiece along a longitudinal direction between a first end of the workpiece and a second end of the workpiece. The method also includes, after cutting the workpiece, applying forces to disengage a first end of the workpiece from the mandrel. The method further includes, after disengaging the first end of the workpiece from the mandrel, applying forces to the second end of the workpiece to deform the workpiece and disengage the second end of the workpiece from the mandrel.

The features, functions, and advantages described herein can be achieved independently in various implementations or may be combined in yet other implementations, further details of which can be found with reference to the following description and drawings.

BRIEF DESCRIPTION OF THE DRAWINGS

FIGS. 3A and 3B illustrate a perspective view and a side view, respectively, of an example of the mandrel of FIG. 1 according to a particular implementation.

FIG. 5 illustrate a perspective view of an example of the demolding tool and the workpiece of FIG. 1 according to a particular implementation.

FIG. 16A illustrate a bottom exterior view of the workpiece of FIG. 1 and indicates a cut line used for the demolding process according to a particular implementation.

FIG. 16B illustrate an interior view of the cut line of FIG. 16 and shows details of a splice used to secure cut edges of the workpiece together according to a particular implementation.

DETAILED DESCRIPTION

Aspects disclosed herein present systems and methods for demolding a composite part (e.g., a workpiece) that fully encircles at least a portion of a mandrel. The disclosed systems and methods enable use of a unitary mandrel (rather than a breakdown mandrel) and a single splice joint.

Particular implementations are described herein with reference to the drawings. In the description, common features are designated by common reference numbers throughout the drawings. The figures and the following description illustrate specific examples. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific examples described below, but by the claims and their equivalents.

Figure 1:
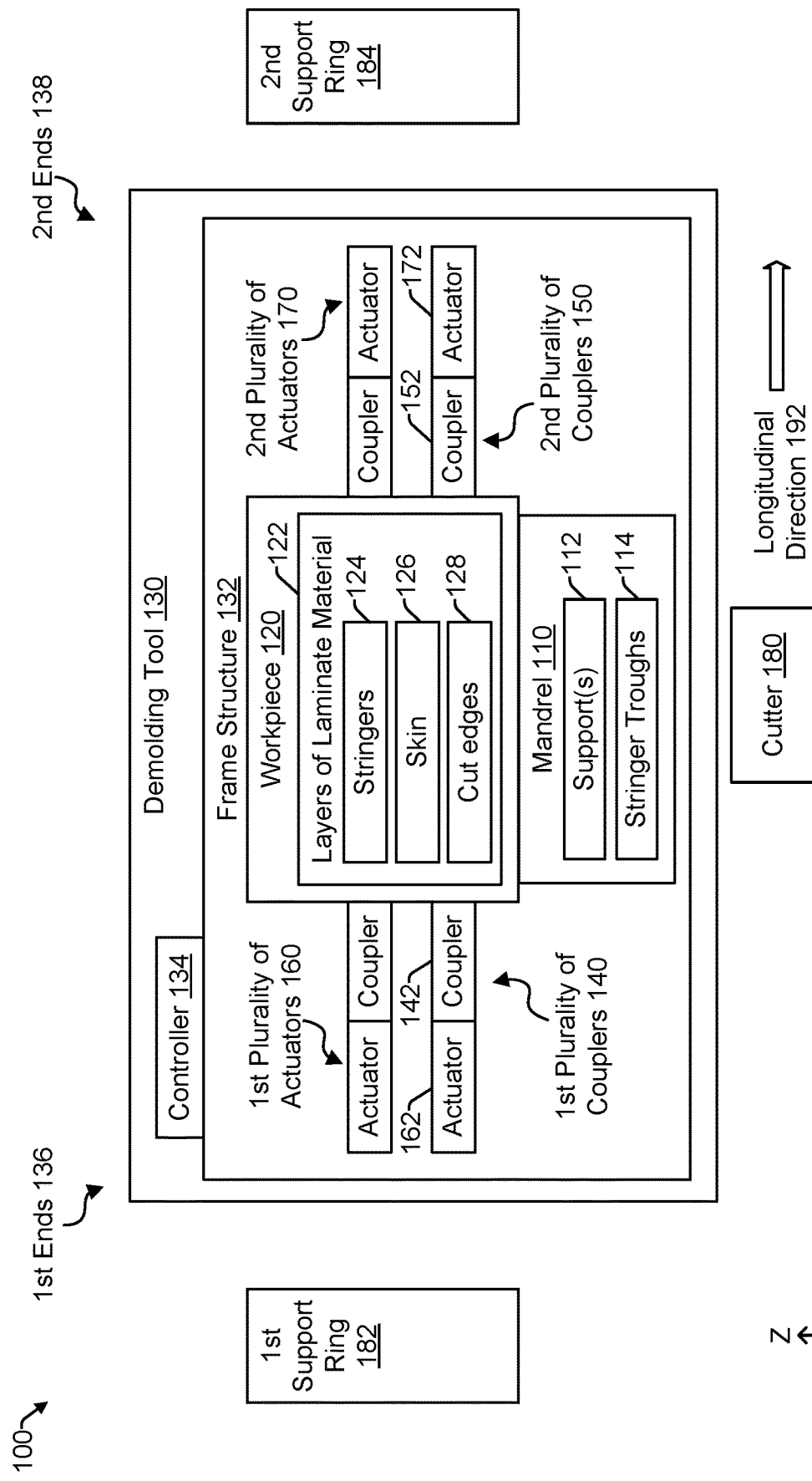
FIG. 1 is a block diagram that illustrates a system including a demolding tool to facilitate removal of a workpiece from a mandrel.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts a system 100 including a mandrel 110 including one or more supports ("support(s)" 112 in FIG. 1), which indicates that in some implementations the mandrel 110 includes a single support 112 and in other implementations the mandrel 110 includes multiple supports 112. For ease of reference herein, such features are generally introduced as "one or more" features and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating", "calculating", "using", "selecting", "accessing", and "determining" are interchangeable unless context indicates otherwise. For example, "generating", "calculating", or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 depicts an example of a system 100 that includes a mandrel 110 and a demolding tool 130. The mandrel 110 is shaped to define the shape of a workpiece (e.g., workpiece 120 of FIG. 1), and the demolding tool 130 is configured to facilitate removal of the workpiece 120 from the mandrel 110 after the workpiece 120 is at least partially cured on the mandrel 110. FIG. 1 also illustrates a plurality of orthogonal axes 190, including an X-axis, a Y-axis, and a Z-axis. Directions parallel to the X-axis are referred to herein as longitudinal directions 192, directions parallel to the Y-axis are referred to herein as lateral directions, and directions parallel to the Z-axis are referred to herein as vertical directions. In FIG. 1, the various components illustrated have orientations that are aligned with one another such that ends of the mandrel 110 are adjacent to corresponding ends of the demolding tool 130 and the workpiece 120. For ease of reference, the ends are labeled in FIG. 1 as first ends 136 and second ends 138. As used herein, a "first end" of the workpiece 120 is a portion of the workpiece 120 that is disposed adjacent to a "first end" of the mandrel 110. Likewise, a "second end" of the workpiece 120 is a portion of the workpiece 120 that is disposed adjacent to a "second end" of the mandrel 110. Thus, the designation of first ends 136 and second ends 138 is arbitrary but is used consistently herein.

In particular implementations, the workpiece 120 include a plurality of layers of laminate material 122, such as a plurality of layers of polymer impregnated fiber tows (commonly referred to as "pre-preg" tows) or other fiber-reinforced polymer materials that are arranged on the mandrel 110 to define a skin 126 having a shape corresponding to a shape of the mandrel 110. For certain applications, the workpiece 120 also includes stringers 124 (e.g., elongated structural members) that extend in one or more directions, such as in the longitudinal direction 192, to stiffen or otherwise mechanically support the skin 126. To shape the workpiece 120 for such applications, the mandrel 110 includes stringer troughs 114 to define shapes of the stringers 124. The stringer troughs 114 are high aspect ratio (e.g., each having a length that is significantly greater than its width) channels defined in a surface of the mandrel 110 to shape (e.g., mold) and retain the stringers 124 during curing of the layers of laminate material 122.

In some implementations, the workpiece 120, when cured, fully encircles at least a portion of the mandrel 110. For example, the workpiece 120, or a portion of the workpiece 120, defines a tubular shape around a portion of the mandrel 110. The mandrel 110 and the workpiece 120 may each have a tapered shape with uneven cross-sectional areas spaced apart along the longitudinal direction 192. To illustrate, the cross-sectional area of the first end of the mandrel 110 may be smaller than the cross-sectional area of the second end of the mandrel 110. In some such implementations, the workpiece 120 is not moveable relative to the mandrel 110 after the workpiece 120 cures because the encircling portion of the workpiece 120 inhibits vertical movement (e.g., along the Z-axis in FIG. 1) and lateral movement (e.g., along the Y-axis of FIG. 1), and interaction of the stringers 124 and the stringer troughs 114 inhibits longitudinal movement (e.g., along the X-axis or along longitudinal direction 192 of FIG. 1). Thus, while the mandrel 110 enables formation of a fully encircling or tubular workpiece 120, it can be challenging to remove the workpiece 120 from the mandrel 110.

The demolding tool 130 is configured to facilitate removal of the workpiece 120 from the mandrel 110 without disassembling the mandrel 110 by using a flay demolding process, which is described further below. Thus, the mandrel 110 can be a unitary or single-piece mandrel. The demolding tool 130 includes a frame structure 132 coupled to a first plurality of actuators 160 and a second plurality of actuators 170. Each actuator of the first plurality of actuators 160 (such as representative actuator 162) is coupled to at least one coupler of a first plurality of couplers 140 (such as to representative coupler 142). Additionally, each actuator of the second plurality of actuators 170 (such as representative actuator 172) is coupled to at least one coupler of a second plurality of couplers 150 (such as to representative coupler 152).

The first plurality of couplers 140 are arranged to couple to a first end of the workpiece 120 while the workpiece 120 is disposed on the mandrel 110. The second plurality of couplers 150 are arranged to couple to the workpiece 120 at locations between the first end of the workpiece 120 and the second end of the workpiece 120. In some implementations, each of the couplers 140, 150 is a surface coupler, such as a suction cup, a vacuum coupler, an adhesive coupler, or another coupler that attaches by contact with an external surface of the workpiece 120. In other implementations, each of the couplers 140, 150 is a subsurface coupler or a through coupler, such as a bolt, a pin, a threaded insert, or another coupler that extends past the external surface of the workpiece 120 into the workpiece 120. In still other implementations, the couplers 140, 150 include a mix of surface couplers, and subsurface couplers/through couplers.

In FIG. 1, the demolding tool 130 includes or is coupled to a controller 134. The controller 134 includes special purpose circuitry and/or one or more processors coupled to a memory. The memory includes a non-transitory computer-readable medium that stores instructions that are executable by the processor(s). For example, the instructions are executable to initiate, perform or control operations to aid in removal of the workpiece 120 from the mandrel 110. The processor(s) can be implemented as a single processor or as multiple processors, such as in a multi-core configuration, a multi-processor configuration, a distributed computing configuration, a cloud computing configuration, or any combination thereof. In some implementations, one or more portions of the controller 134 are implemented using dedicated hardware, firmware, or a combination thereof.

The controller 134 is configured to control operation of the actuators 160, 170 (e.g., by sending control signals to the actuators 160, 170), and possibly other components, such as a cutter 180, sensors, etc., during the flay demolding process. For example, in a particular implementation, the controller 134 is configured to send control signals to cause one or more of the actuators 160, 170 to pre-tension one or more of the couplers 140, 150 with respect to the workpiece 120 before the cutter 180 cuts the workpiece 120. After the cutter 180 cuts the workpiece 120, the controller 134 is configured to send control signals to cause one or more of the actuators 160, 170 to apply forces to at least partially disengage the first end of the workpiece 120 from the first end of the mandrel 110, and after at least partially disengaging the first end of the workpiece 120 from the first end of the mandrel 110, to apply forces to at least partially disengage the second end of the workpiece 120 from the mandrel 110. Controlling the flay demolding process in this manner has various benefits. For example, pre-tensioning one or more of the couplers 140, 150 limits longitudinal movement of the workpiece 120 relative to the mandrel 110 during and after cutting the workpiece 120. Such longitudinal movement could result in high contact pressure between ends of the stringers 124 and ends of the stringer troughs 114, which could damage the workpiece 120, the mandrel 110, or both. Additionally, modeling has shown that at least partially disengaging the first end of the workpiece 120 (e.g., a smaller end of the workpiece 120) from the first end of the mandrel 110 before applying forces to at least partially disengage the second end of the workpiece 120 (e.g., a larger end of the workpiece 120) from the mandrel 110 limits stresses induced within the workpiece 120 and contact pressure between ends of the stringers 124 and ends of the stringer troughs 114 to within acceptable tolerances while deforming the workpiece 120 sufficiently to remove the workpiece 120 from the mandrel 110.

In some implementation, one or more of the couplers 140, 150 are positioned to couple to the workpiece 120 at locations that overlying ends of one or more of the stringers 124. For example, in a particular implementation, each of the first plurality of couplers 140 is positioned to couple to the workpiece 120 at a location radially overlying a respective stringer of the plurality of stringers 124. In such implementations, applying forces to at least partially disengaging the first end of the workpiece 120 from the first end of the mandrel 110 before applying forces to at least partially disengage the second end of the workpiece 120 from the mandrel 110 disengages the first ends of the stringers 124 from corresponding stringer troughs 114 early in the flay demolding process so that subsequent longitudinal movement between the workpiece 120 and the mandrel 110 does not damage the first ends of the stringers 124 or the stringer troughs 114.

During operation, the layers of laminate material 122 are applied to the mandrel 110 to form the skin 126. In some implementations, material is deposited or applied in the stringer troughs 114 before the layers of the laminate material 122 of the skin 126 are applied to the mandrel 110 so that the stringer 124 and the skin 126 cure together. In a particular implementation, layup of the layers of laminate material 122 is performed using one or more automated fiber placement tools. In this implementation, the automated fiber placement tool(s) may be too large to fit in the demolding tool 130, in which case layup is performed remote from or outside of the demolding tool 130. After layup is complete, the layers of laminate material 122 are cured or partially cured (e.g., sufficiently cured for the workpiece 120 to be mechanically stable), and the workpiece 120 and mandrel 110 are positioned in the demolding tool 130. For example, the mandrel 110 or the demolding tool 130 may be mounted on rollers, tracks, or another mechanism to enable relative motion of the mandrel 110 and the demolding tool 130.

After the mandrel 110 and the workpiece 120 are positioned relative to the demolding tool 130, the couplers 140, 150 are attached to the workpiece 120. In some implementations, the couplers 140, 150 include sub-surface or through couplers, in which case the couplers 140, 150 or portions thereof (such as posts, bolts, washers, threaded inserts, are disposed in or through the workpiece 120 during the layup operation or after curing and before the couplers 140, 150 are attached to the workpiece 120. In some implementations, the couplers 140, 150 include surface couplers which can be attached to the workpiece 120 while the workpiece 120 is in position relative to the demolding tool 130. For example, when the couplers 142 include one or more vacuum couplers, a vacuum cup of the coupler 142 can be coupled to the surface of the workpiece 120 after the workpiece 120 is in position relative to the demolding tool 130. In some implementations, the positions of at least some of the couplers 140, 150 on the surface of the workpiece 120 are carefully controlled. For example, the coupler 142 can be coupled to the surface of the workpiece 120 at a location that radially overlies one of the stringers 124.

In some implementations, the couplers 140, 150 are de-attached from the actuators 160, 170 during attachment to the workpiece 120. In such implementations, the couplers 140, 150 are attached to the actuators 160, 170 after the couplers 140, 150 are attached to the workpiece 120. In other implementations, the couplers 140, 150 remain attached to the actuators 160, 170 during attachment of the couplers 140, 150 to the workpiece 120.

After the couplers 140, 150 are coupled to the workpiece 120, the controller 134 sends control signals to one or more of the actuators 160, 170 to pre-tension the one or more of the actuators 160, 170 and respective couplers 140, 150. As used herein, "pre-tensioning" refers to using an actuator to applying sufficient force to a coupler to remove slack between the workpiece 120 and the frame structure 132, or put another way, to ensure that joints, couplings, and members between the frame structure 132 and the workpiece 120 are in tension. In a particular implementation, the controller 134 is configured to send control signals to a subset of the actuators 160, 170 (such as to the first plurality of actuators 160, to the second plurality of actuators 170, or to some of each plurality of actuators 160, 170) to cause the subset of the actuators 160, 170 to pre-tension respective ones of the couplers 140, 150 with respect to the workpiece 120. Pre-tensioning at least some of the couplers 140, 150 inhibits movement of ends of the stringers 124 towards ends of the stringer troughs 114 when a cut is made in the workpiece 120.

With one or more of the actuators 160, 170 pre-tensioned, the cutter 180 is activated to cut the workpiece 120 along the longitudinal direction 192. In a particular implementation, the cutter 180 cuts the workpiece 120 end-to-end at or near a bottom (e.g., a lowest vertical or Z-axis location in FIG. 1) of the workpiece 120. As the cut is made, cut edges 128 of the workpiece 120 may be supported by the actuators 160, 170, or may be allowed to sag such that a portion of the workpiece 120 adjacent to the cut edges 128 at least partially disengages from the mandrel 110. In some implementations, the mandrel 110 has a tapered shape along the longitudinal direction (e.g., the first end of the mandrel 110 has a cross-sectional area that is smaller than a cross-sectional area of the second end of the mandrel 110). In such implementations, the stringer troughs 114 converge toward the first end of the mandrel 110. Cutting the workpiece 120 can free the workpiece 120 from the mandrel 110 sufficiently to allow the workpiece 120 to shift toward the first end of the mandrel 110, which can allow enough contact pressure between the ends of the stringers 124 and the stringer troughs 114 to damage or delaminate the stringers 124. Pre-tensioned at least a subset of the actuators 160, 170 before cutting the workpiece 120 inhibits such motion during and after the cutting operation and protects the stringers 124 from damage.

After the cut is formed in the workpiece 120, the controller 134 sends control signals to cause the first plurality of actuators 160 to apply first forces to the workpiece 120 via the first plurality of couplers 140. The first forces are sufficient to deform the workpiece 120 and at least partially disengage the first end of the workpiece 120 from the first end of the mandrel 110. In some implementations, the first forces applied by the first plurality of actuators 160 have components along all three of the orthogonal axes 190 of FIG. 1. For example, the first plurality of actuators 160 pull the workpiece 120 upward (along the Z-axis) to keep the stringers 124 aligned vertically with the stringer troughs 114, pull the workpiece 120 longitudinal (e.g., toward the second ends 138 along the X-axis) to reduce contact pressure between first ends of the stringers 124 and first ends of the stringer troughs 114, and pull the workpiece 120 laterally (e.g., along the Y-axis) to peel (or otherwise deform) the first end of the workpiece 120 away from the first end of the mandrel 110.

After the first forces are applied and the first end of the workpiece 120 is at least partially disengaged from the mandrel 110, the controller 134 sends control signals to cause the second plurality of actuators 170 to apply second forces to the workpiece 120 via the second plurality of couplers 150. The second forces further deform the workpiece 120 and at least partially disengage the second end of the workpiece 120 from the mandrel 110. In some implementations, the second forces applied by the second plurality of actuators 170 have components along two of the orthogonal axes 190 of FIG. 1. For example, the second plurality of actuators 170 pull the workpiece 120 upward (along the Z-axis) and pull the workpiece 120 laterally (e.g., along the Y-axis) to peel (or otherwise deform) the second end of the workpiece 120 away from the second end of the mandrel 110.

After the second forces are applied, vertical (e.g. along the Z-axis) movement is used to separate and fully disengage the workpiece 120 and the mandrel 110. In some implementations, the actuators 160, 170 apply third forces to lift the workpiece 120 from the mandrel 110. In other implementations, the mandrel 110 is lowered to remove the mandrel 110 from the workpiece 120. In still other implementations, the frame structure 132 is lifted to remove the workpiece 120 from the mandrel 110.

After the workpiece 120 and the mandrel 110 are completely disengaged, longitudinal (e.g., along the X-axis) movement is used to fully remove the mandrel 110 from the interior of the workpiece 120. For example, the same movement mechanism used to position the mandrel 110 and the workpiece 120 relative to the demolding tool 130 may be used to separate the mandrel 110 from the workpiece 120 and the demolding tool 130. In some implementations, the mandrel 110 is moveable on wheels, rollers, tracks, etc. to enable the mandrel 110 to be moved away from the workpiece 120 and the demolding tool 130. In other implementations, the demolding tool 130 is moveable on wheels, rollers, tracks, etc. to enable the demolding tool 130 and workpiece 120 to be moved away from the mandrel 110. In either implementation, one or more of the support(s) 112 of the mandrel 110 may be moved between the cut edges 128 of the workpiece 120 as the mandrel 110 and the workpiece 120 are separated. Thus, the mandrel 110 can support at both ends 136, 138 without interfering with removal of the workpiece 120 from the mandrel 110 after the workpiece 120 is cured.

After the mandrel 110 is removed from the workpiece 120, the workpiece 120 may be stabilized and retained by the demolding tool 130 during post-processing operations, such as inspection and splicing the cut edges 128 together. In some implementations, support rings 182, 184 are attached to one or both ends 136, 138 of the workpiece 120 to stabilize and retain the workpiece 120. In some such implementations, the support rings 182, 184 fully support the workpiece 120 to allow the workpiece 120 to be decoupled from and removed from the demolding tool 130.

Thus, a flay demolding process using the demolding tool 130 enables removing the workpiece 120 from the mandrel 110 without breaking down or disassembling the mandrel 110 even though the workpiece 120 fully encircles a portion of the mandrel 110. Additionally, by using the flay demolding process with the demolding tool 130, the workpiece 120 can be finished with a single splice joint to join the cut edges 128.

Figure 2:
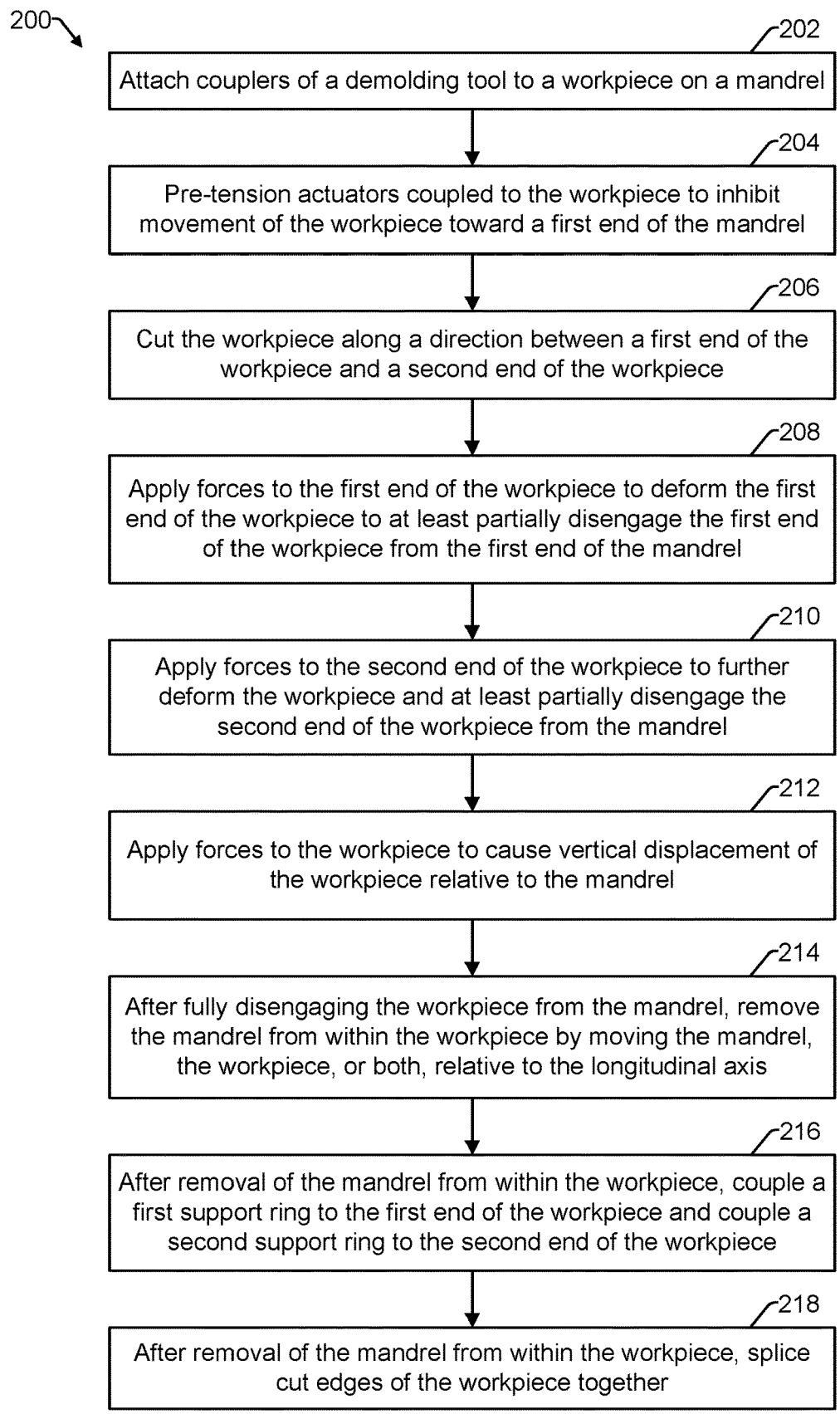
FIG. 2 is flow chart of an example of a method of using the demolding tool of FIG. 1 to remove the workpiece from the mandrel.

FIG. 2 is flow chart of an example of a method 200 of using the demolding tool 130 of FIG. 1 to remove the workpiece 120 from the mandrel 110. The method 200 begins after a workpiece is cured or at least partially cured on a mandrel. For example, layers of laminate material 122 of FIG. 1 can be applied to the mandrel 110 and cured or partially cured to conform to a shape defined by the mandrel 110. In some implementations, the workpiece 120 fully encircles at least a portion of the mandrel 110. Further, in some implementations, the mandrel 110 is tapered. For example, a first end of the mandrel 110 may have a smaller cross-sectional area than a second end of the mandrel 110. In some implementations, the mandrel 110 also includes stringer troughs 114 to facilitate curing stringers 124 to a skin 126 of the workpiece 120.

The method 200 includes, at block 202, attaching couplers of a demolding tool to the workpiece on the mandrel. For example, the couplers 140, 150 of FIG. 1 are coupled to the workpiece 120. The couplers 140, 150 include surface couplers, sub-surface couplers, through couplers, or a combination thereof. A first set of couplers 140, 150 (e.g., the first plurality of couplers 140) are coupled to a first end of the workpiece 120, and a second set of the couplers 140, 150 (e.g., the second plurality of couplers 150) are coupled to the workpiece 120 between the first set of couplers and the second end of the workpiece 120.

The method 200 also includes, at block 204, pre-tensioning actuators coupled to the workpiece to inhibit movement of the workpiece toward a first end of the mandrel. For example, at least a subset of the couplers 140, 150 are pre-tensioned by respective actuators 160, 170 to removes slack from between the workpiece 120 and the frame structure 132.

The method 200 also includes, at block 206, after at least some of the couplers are pre-tensioned, cutting the workpiece along a direction between a first end of the workpiece and a second end of the workpiece. For example, while at least a subset of the couplers 140, 150 of FIG. 1 are in tension, the cutter 180 is activated to cut the bottom of the workpiece 120 end-to-end along the longitudinal direction 192. In some implementations, cutting the workpiece 120 allows at least a portion of the workpiece 120 to separate from the mandrel 110 due to sag at the cut edges 128 of the workpiece 120.

The method 200 also includes, at block 208, applying forces (e.g., first forces after pre-tensioning) to the first end of the workpiece to deform the first end of the workpiece to at least partially disengage the first end of the workpiece from the first end of the mandrel. For example, the first plurality of actuators 160 may be activated to apply the forces to the first end of the workpiece 120 via the first plurality of couplers 140. In some implementations, the forces applied to the workpiece 120 by the first plurality of actuators 160 via the first plurality of couplers 140 have components along a lateral axis (e.g., the Y-axis in FIG. 1), a vertical axis (e.g., the Z-axis in FIG. 1), and the longitudinal axis (e.g., the X-axis in FIG. 1).

The method 200 also includes, at block 210, applying forces (e.g., second forces after pre-tensioning) to the second end of the workpiece to further deform the workpiece and at least partially disengage the second end of the workpiece from the mandrel. For example, the second plurality of actuators 170 may be activated to apply the forces to the second end of the workpiece 120 via the second plurality of couplers 150. In some implementations, the forces applied to the workpiece 120 by the second plurality of actuators 170 via the second plurality of couplers 150 have components along the lateral axis (e.g., the Y-axis in FIG. 1) and the vertical axis (e.g., the Z-axis in FIG. 1). In some implementations, forces applied by the second plurality of actuators 170 also have components along the longitudinal axis (e.g., the X-axis in FIG. 1); however, in other implementations, the forces applied by the second plurality of actuators 170 do not have components along the longitudinal axis.

The method 200 also includes, at block 212, applying forces (e.g., third forces after pre-tensioning) to the workpiece to cause vertical displacement of the workpiece relative to the mandrel. For example, one or more actuators of the second plurality of actuators 170 may be coupled to an upper surface of the workpiece 120 and may lift the workpiece 120 away from the mandrel 110. In some implementations, the mandrel 110 can be lowered to cause vertical displacement of the workpiece 120 relative to the mandrel 110. In such implementations, lowering the mandrel 110 can be used in addition to applying lifting forces to the workpiece 120, or lowering the mandrel 110 can be used instead of applying lifting forces to the workpiece 120.

The method 200 also includes, at block 214, after fully disengaging the workpiece from the mandrel, removing the mandrel from within the workpiece by moving the mandrel, the workpiece, or both, relative to the longitudinal direction. For example, the mandrel 110 can be moved along the longitudinal direction 192 to remove the mandrel 110 from within the workpiece 120. In some implementations, one or more supports 112 of the mandrel 110 move between the cut edges 128 of the workpiece 120 as the mandrel 110 is removed from within the workpiece 120.

The method 200 also includes, at block 216, after removal of the mandrel from within the workpiece, coupling a first support ring to the first end of the workpiece and coupling a second support ring to the second end of the workpiece. For example, the first support ring 182 of FIG. 1 is coupled to the first end of the workpiece 120, and the second support ring 184 is coupled to the second end of the workpiece 120.

The method 200 also includes, at block 218, after removal of the mandrel from within the workpiece, splicing cut edges of the workpiece together. For example, the cut edges 128 of the workpiece 120 can be joined together using a splice joint, as described further with reference to FIGS. 16A and 16B.

Thus, the method 200 enables separation of the mandrel 110 and the workpiece 120 without disassembling the mandrel 110 and using a single splice joint to join the cut edges 128.

FIGS. 3A-16B illustrate various examples of the components described with reference to FIG. 1 in the context of aircraft manufacturing. For example, in each of FIGS. 3A-16B, the workpiece 120 corresponds to a section of a structure of an aircraft, such as a portion of a fuselage of an aircraft. In other implementations, other aircraft components or workpieces unrelated to aircraft can be manufactured using the system 100 of FIG. 1.

FIGS. 3A and 3B illustrate a perspective view and a side view, respectively, of an example of the mandrel 110 of FIG. 1 according to a particular implementation. In FIGS. 3A and 3B, a surface 302 of the mandrel 110 is shaped to form a portion of a fuselage of an aircraft, such as a forward section of the fuselage. For example, the mandrel 110 has a tapered shape such that the first end 136 of the mandrel 110 has a smaller cross-sectional area than the second end 138 of the mandrel 110.

FIGS. 3A and 3B also illustrate examples of the stringer troughs 114 of FIG. 1. In FIGS. 3A and 3B, the stringer troughs 114 extend longitudinally (e.g., along the X-axis) on the surface 302 of the mandrel 110. In this example, due to the tapering shape of the mandrel 110, the stringer troughs 114 converge toward the first end 136 of the mandrel 110.

FIGS. 3A and 3B also illustrate an example of the support(s) 112 of FIG. 1. FIGS. 3A and 3B illustrate only a single support 112 at the first end 136 of the mandrel 110; however, in other examples, the mandrel 110 includes one or more additional supports 112 at the first end 136, one or more supports 112 at the second end 138, or both.

Figure 4A:
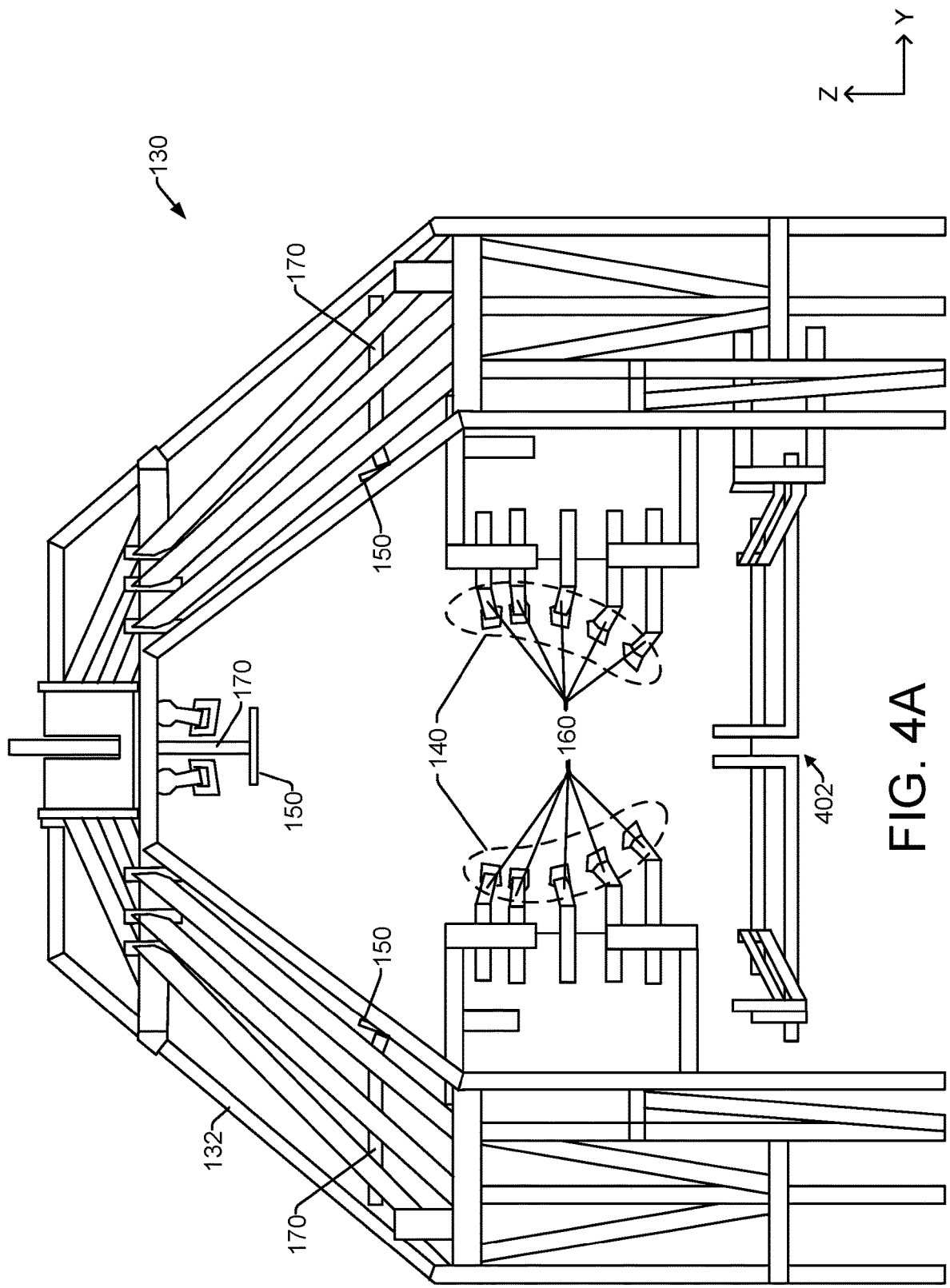
FIGS. 4A and 4B illustrate an end view and a perspective view, respectively, of an example of the demolding tool of FIG. 1 according to a particular implementation.
Figure 4B:
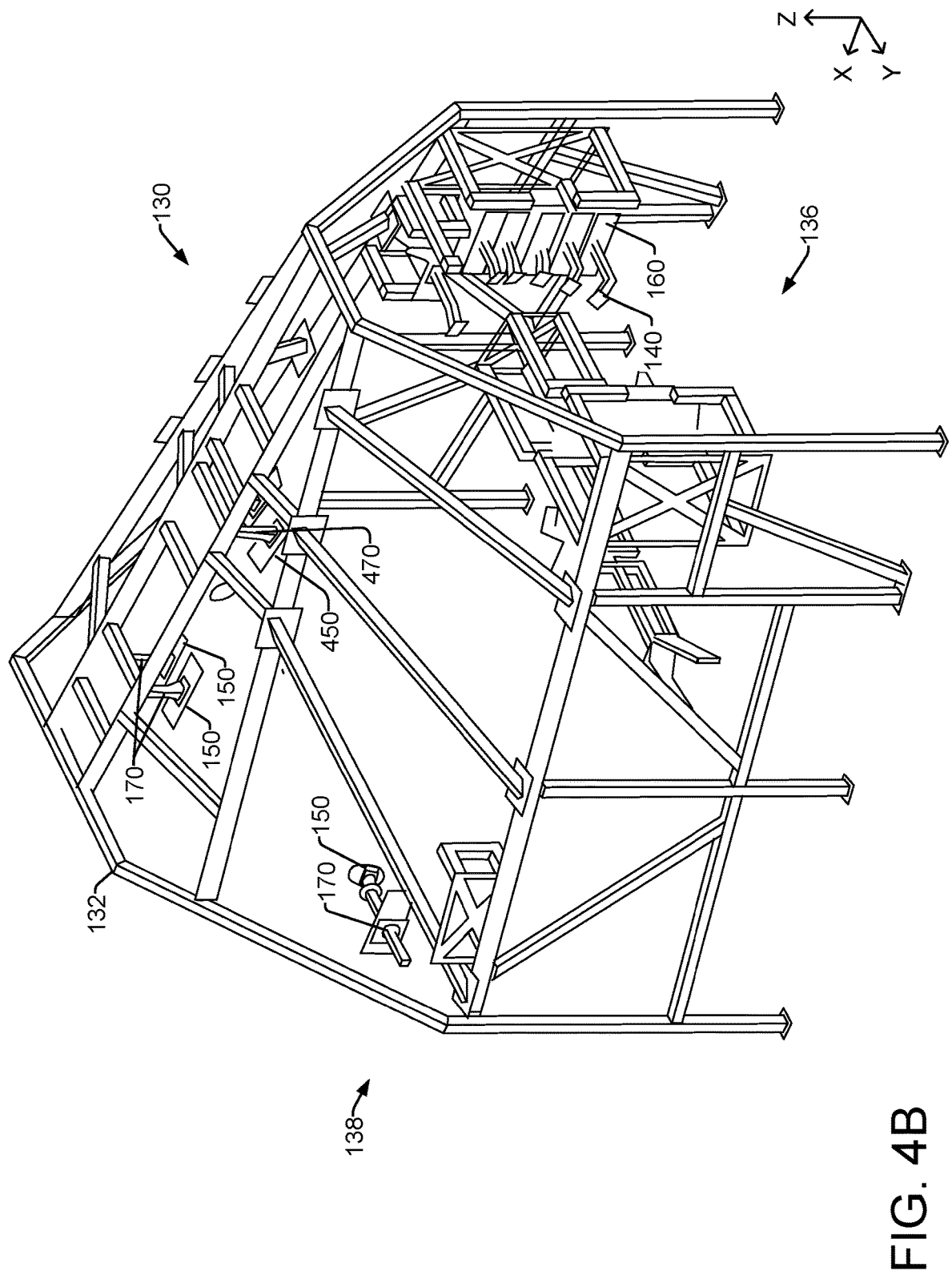

FIGS. 4A and 4B illustrate an end view and a perspective view, respectively, of an example of the demolding tool 130 of FIG. 1 according to a particular implementation. The demolding tool 130 in FIGS. 4A and 4B includes the frame structure 132, the first plurality of actuators 160, and the second plurality of actuators 170. The first plurality of couplers 140 are attached to the first plurality of actuators 160, and the second plurality of couplers 150 are attached to the second plurality of actuators 170. FIG. 4A also illustrates a gap 402 of the frame structure 132. The gap 402 enables one or more of the supports 112 of the mandrel 110 to pass between members of the frame structure 132 as the mandrel 110 is moved relative to the demolding tool 130.

FIG. 4B illustrates a coupler 450 attached to an actuator 470. In the example illustrated in FIG. 4B, the coupler 450 and the actuator 470 are located forward of the second plurality of couplers 150 and the second plurality of actuators 170 (e.g., closer to the first end 136 than the second end). In some implementations, the coupler 450 and the actuator 470 are considered members of the second plurality of couplers 150 and the second plurality of actuators 170, respectively. For example, the actuator 470 can be controlled by the controller 134 of FIG. 1 when the controller 134 controls the second plurality of actuators 170. Alternatively, in some implementations, the coupler 450 and the actuator 470 are distinct from (e.g., not members of) the second plurality of couplers 150 and the second plurality of actuators 170, respectively. For example, the controller 134 may control the actuators 470 independently of the first and second pluralities of actuators 160, 170. To illustrate, the actuator 470 can be used to lift the workpiece 120 from the mandrel 110 after the first and second pluralities of actuators 160, 170 have been actuated to disengage the ends 136, 138 of the workpiece 120 from the mandrel 110.

FIG. 5 illustrates a perspective view of an example of the demolding tool 130 and the workpiece 120 of FIG. 1 according to a particular implementation. The example illustrated in FIG. 5 illustrates the couplers 140, 150 coupled to the workpiece 120, which is supported in the frame structure 132.

Figure 6:
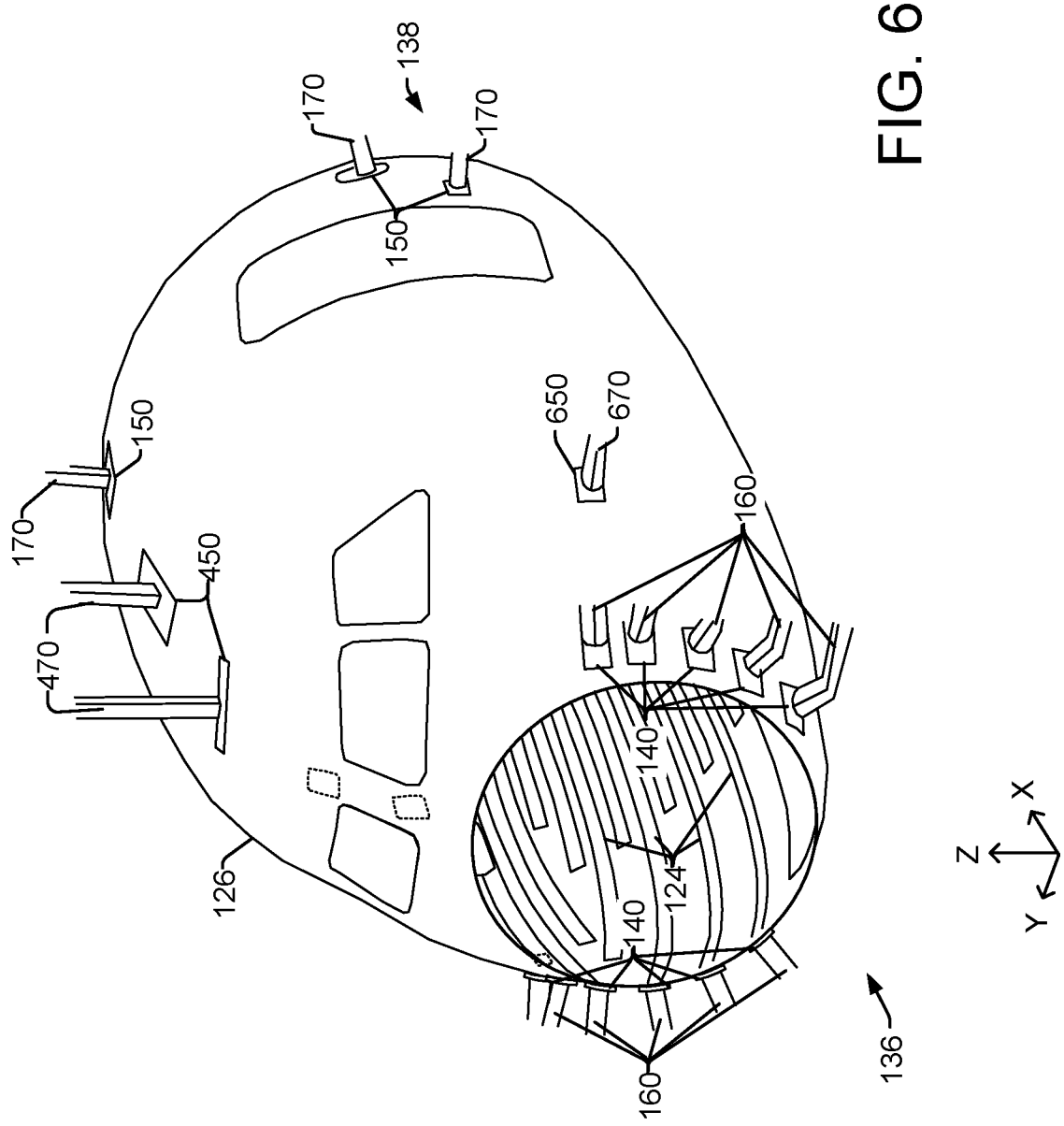
FIG. 6 illustrate a perspective view of an example of the workpiece and couplers and actuators of the demolding tool of FIG. 1 according to a particular implementation.

FIG. 6 illustrates a perspective view of an example of the workpiece 120 and couplers 140, 150, 450 and actuators 160, 170, 470 of the demolding tool 130 according to a particular implementation. FIG. 6 also illustrates examples of the stringers 124 extending longitudinally from the first end 136 toward the second end 138 of the workpiece 120.

FIG. 6 illustrates a coupler 650 attached to an actuator 670. In the example illustrated in FIG. 6, the coupler 650 and the actuator 670 are located forward of the second plurality of couplers 150 and the second plurality of actuators 170 (e.g., closer to the first end 136 than the second end 138). In some implementations, the coupler 650 and the actuator 670 are consider members of the first plurality of couplers 140 and the first plurality of actuators 160, respectively. For example, the actuator 670 can be controlled by the controller 134 of FIG. 1 when the controller 134 controls the first plurality of actuators 160. Alternatively, in some implementations, the coupler 650 and the actuator 670 are consider members of the second plurality of couplers 150 and the second plurality of actuators 170, respectively. In another alternative, in some implementations, the coupler 650 and the actuator 670 are distinct from (e.g., not members of) the first or second plurality of couplers 140, 150 and the first or second plurality of actuators 160, 170, respectively. For example, the controller 134 may control the actuators 670 independently of the first and second pluralities of actuators 160, 170.

Figure 7:
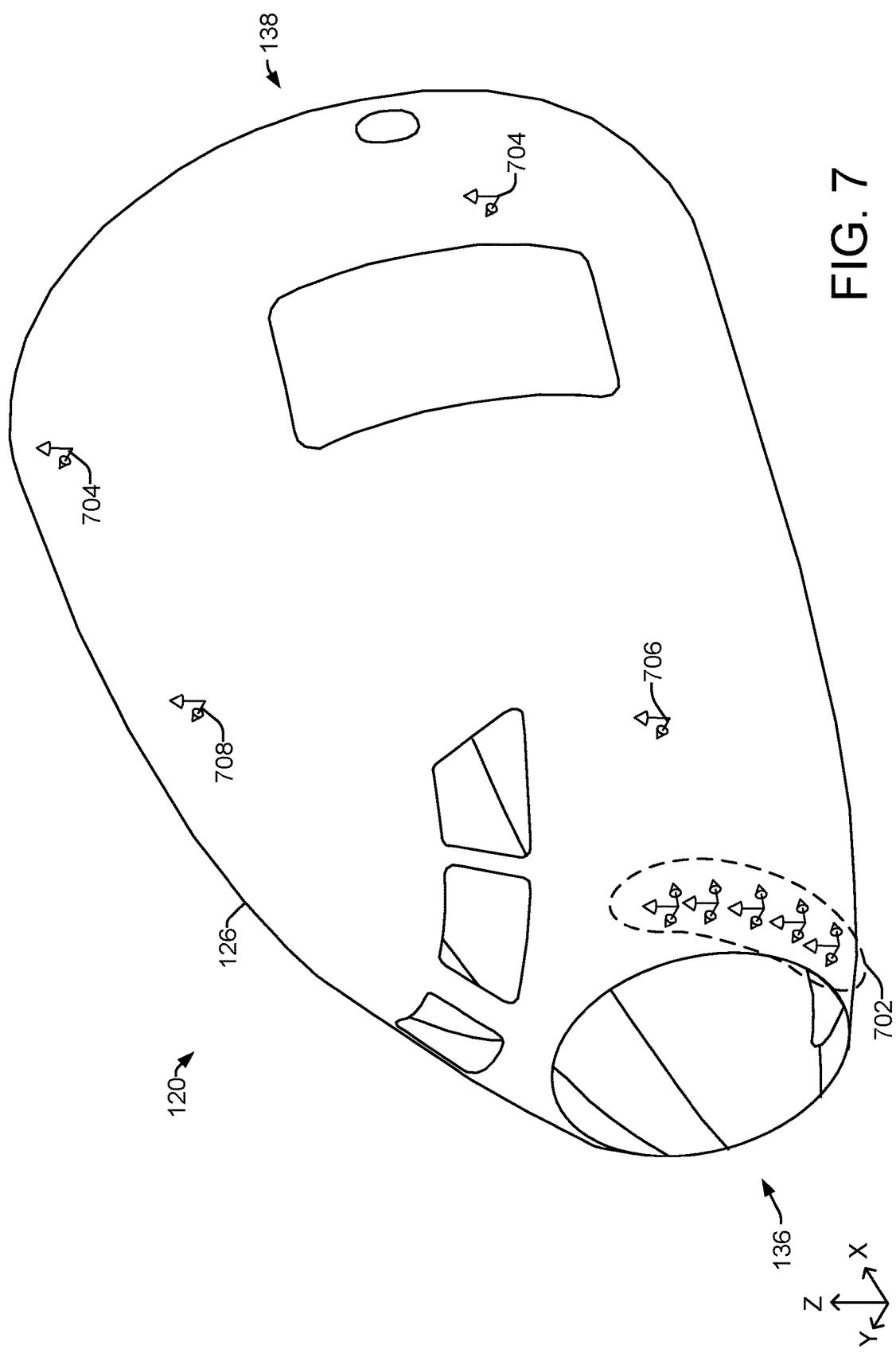
FIG. 7 illustrate a perspective view of an example of the workpiece and components of force applied to the workpiece by actuators of the demolding tool of FIG. 1 during a demolding process according to a particular implementation.

FIG. 7 illustrates a perspective view of an example of the workpiece 120 and components of force applied to the workpiece 120 by the actuators 160, 170 of the demolding tool 130 of FIG. 1 during a demolding process according to a particular implementation. The illustrated components of force include first components of force 702 applied by the first plurality of actuators 160, second components of force 704 applied by the second plurality of actuators 170, third components of force 706 applied by the actuator 670 of FIG. 6, and fourth components of force 708 applied by the actuator 470 of FIG. 4B. In the example illustrated in FIG. 7, the first components of force 702 are along all three of the orthogonal axes 190 (e.g., the X-axis, the Y-axis, and the Z-axis), whereas the second components of force 702, the third components of force 704, and the fourth components of force 708 are along two of the three orthogonal axes 190 (e.g., the Y-axis and the Z-axis).

Figure 8B:
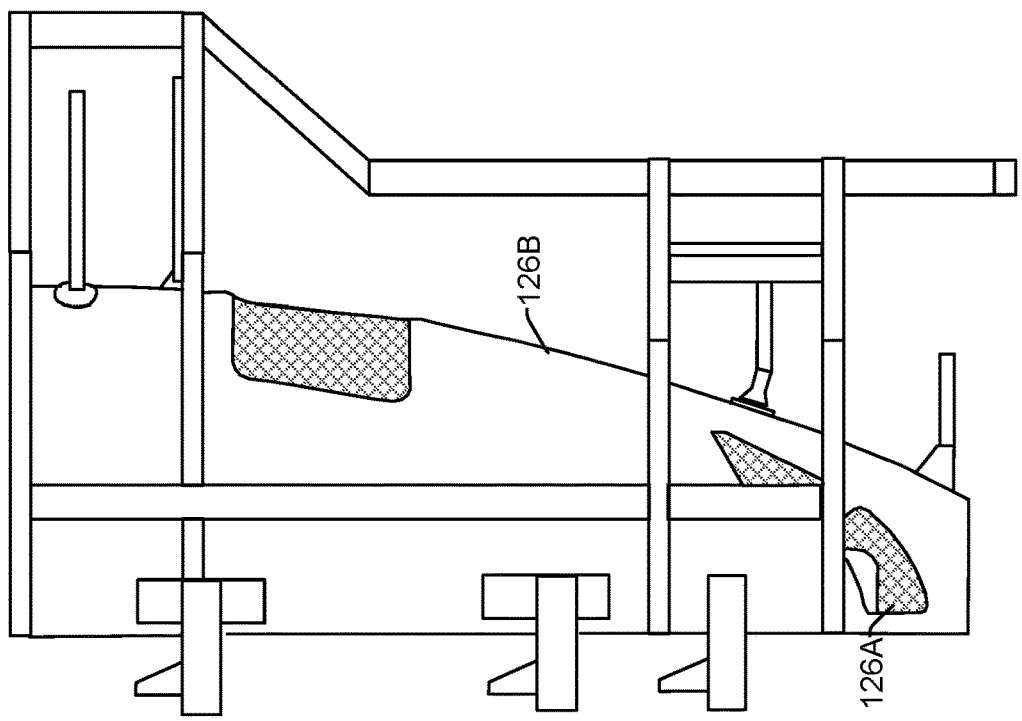
FIGS. 8A and 8B illustrate an end view and a top view, respectively, of an example of the workpiece disposed in the demolding tool of FIG. 1 during a first stage of a demolding process according to a particular implementation.
Figure 8A:
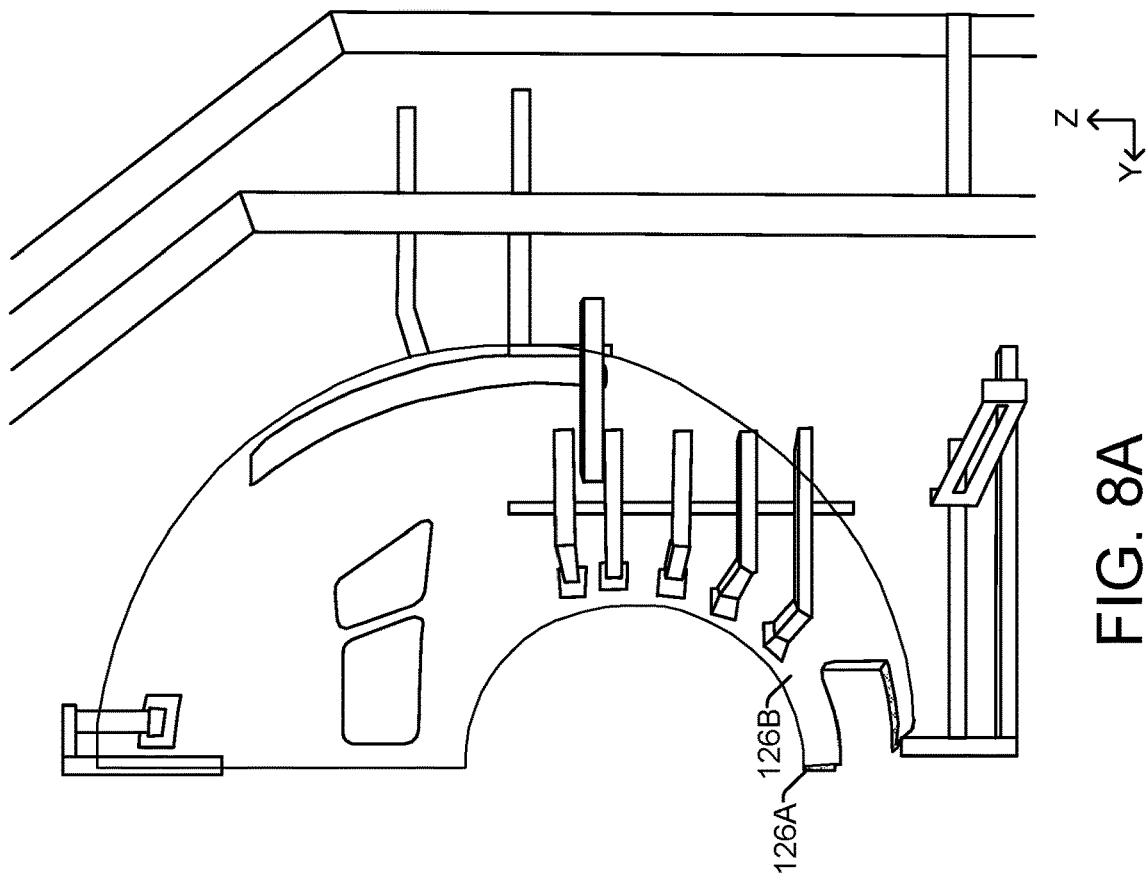
Figure 9B:
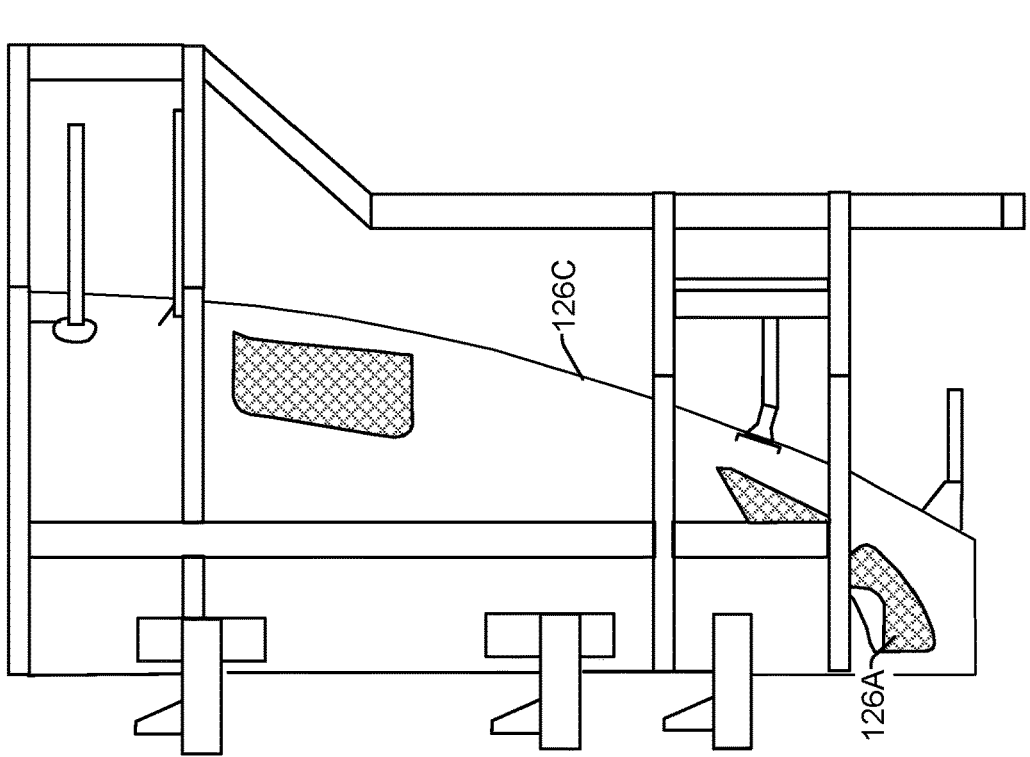
FIGS. 9A and 9B illustrate an end view and a top view, respectively, of an example of the workpiece disposed in the demolding tool of FIG. 1 during a second stage of a demolding process according to a particular implementation.
Figure 9A:
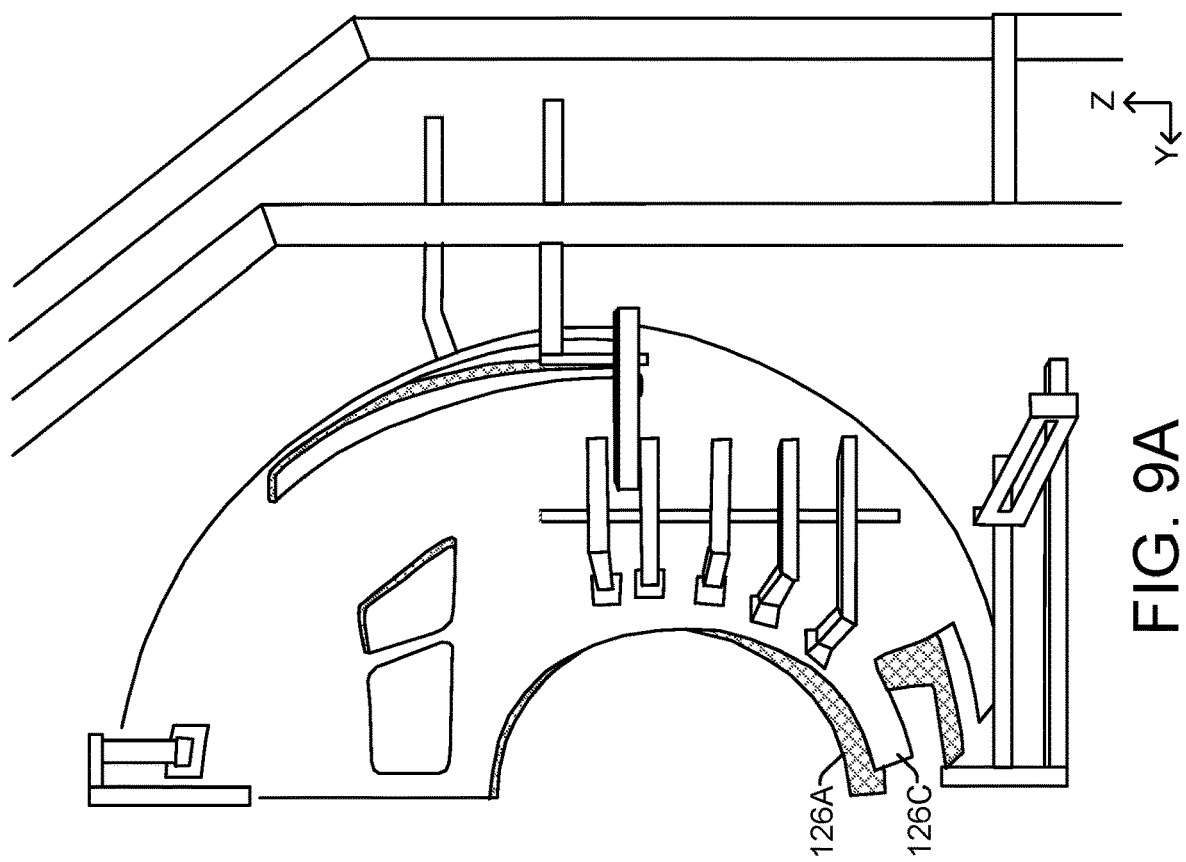
Figure 10B:
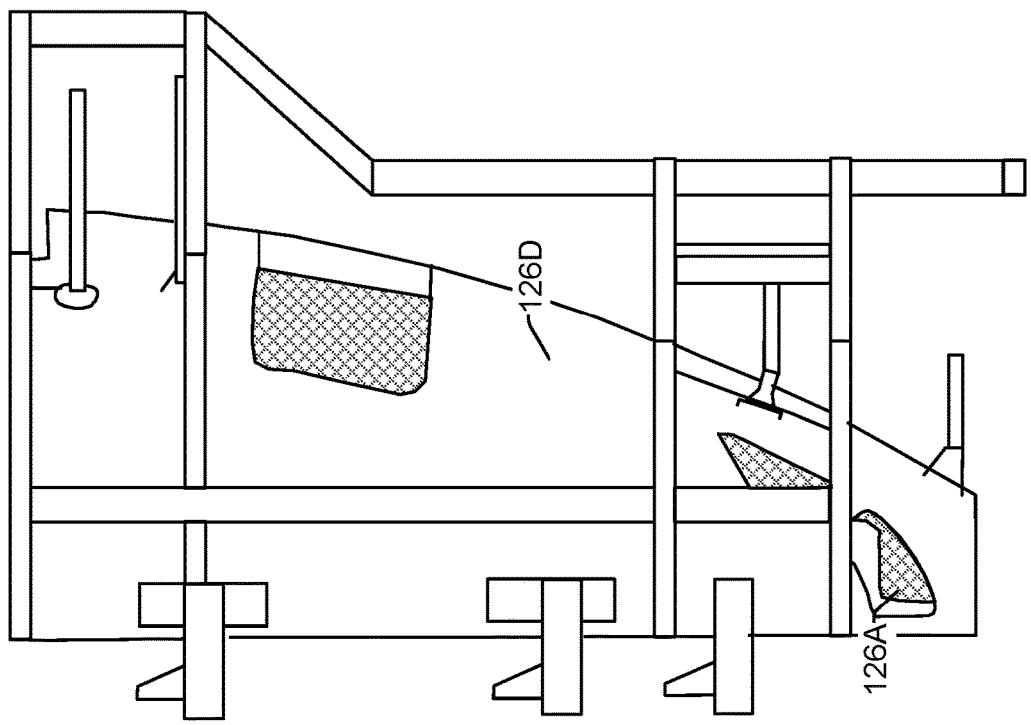
FIGS. 10A and 10B illustrate an end view and a top view, respectively, of an example of the workpiece disposed in the demolding tool of FIG. 1 during a third stage of a demolding process according to a particular implementation.
Figure 10A:
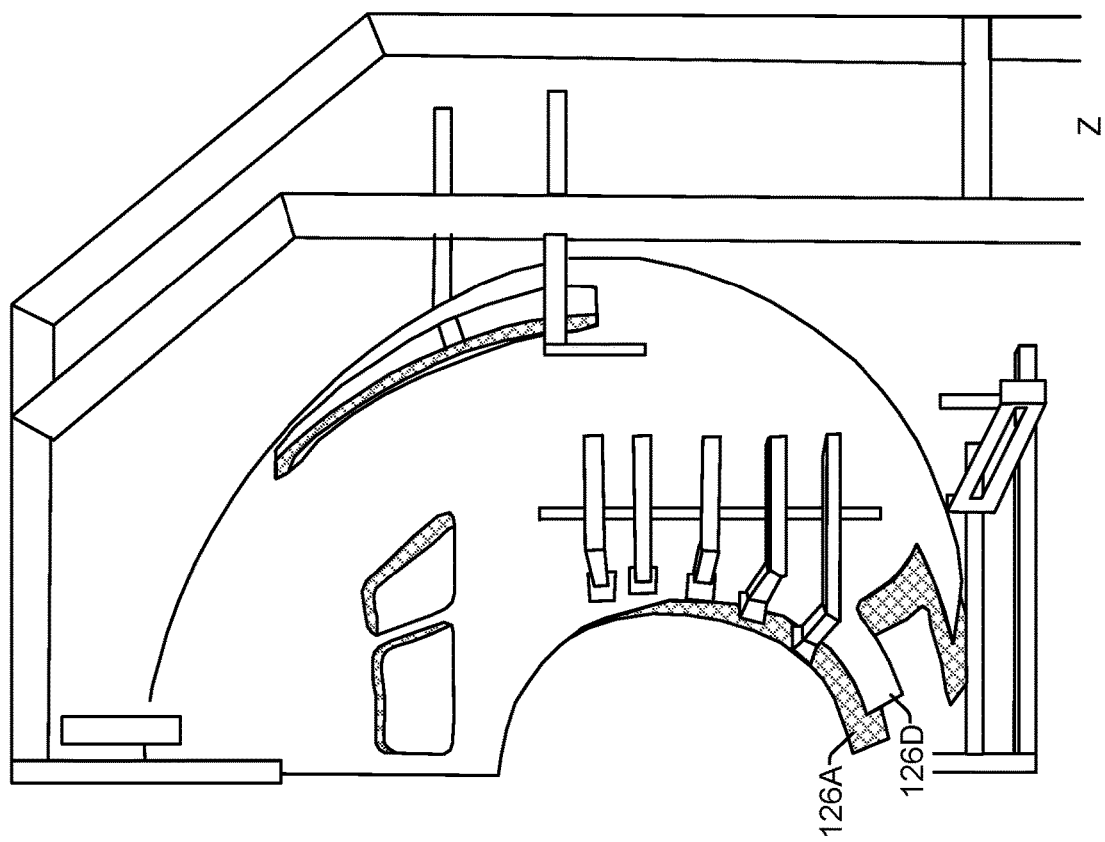
Figure 11B:
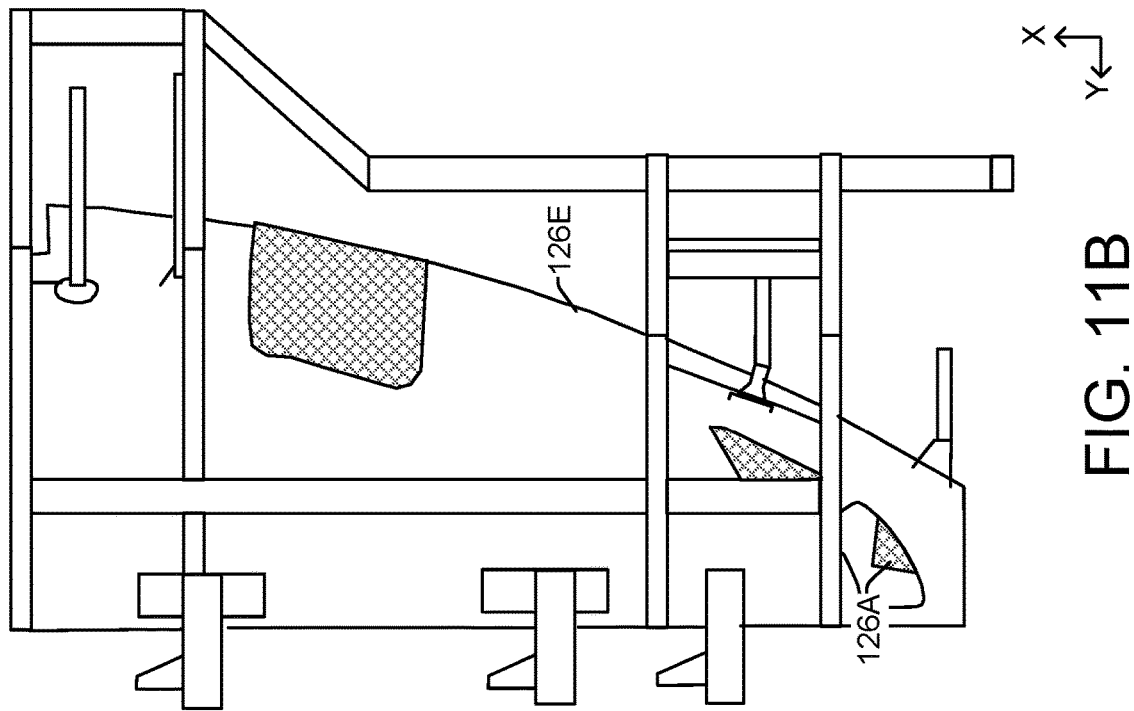
FIGS. 11A and 11B illustrate an end view and a top view, respectively, of an example of the workpiece disposed in the demolding tool of FIG. 1 during a fourth stage of a demolding process according to a particular implementation.

FIGS. 8A-11B illustrate deformation of the workpiece 120 during various stages of a demolding process according to a particular implementation. Each of FIGS. 8A, 9A, 10A and 11A illustrates an end view of an example of the workpiece 120 disposed in the demolding tool 130 during a respective stage of the demolding process. Each of FIGS. 8B, 9B, 10B and 11B illustrates a top view of an example of the workpiece 120 disposed in the demolding tool 130 during a respective stage of the demolding process. FIGS. 8A and 8B illustrate a first stage of the demolding process, FIGS. 9A and 9B illustrate a second stage of a demolding process that is subsequent to the first stage. FIGS. 10A and 10B illustrate a third stage of a demolding process that is subsequent to the second stage. FIGS. 11A and 11B illustrate a fourth stage of a demolding process that is subsequent to the third stage.

Figure 11A:
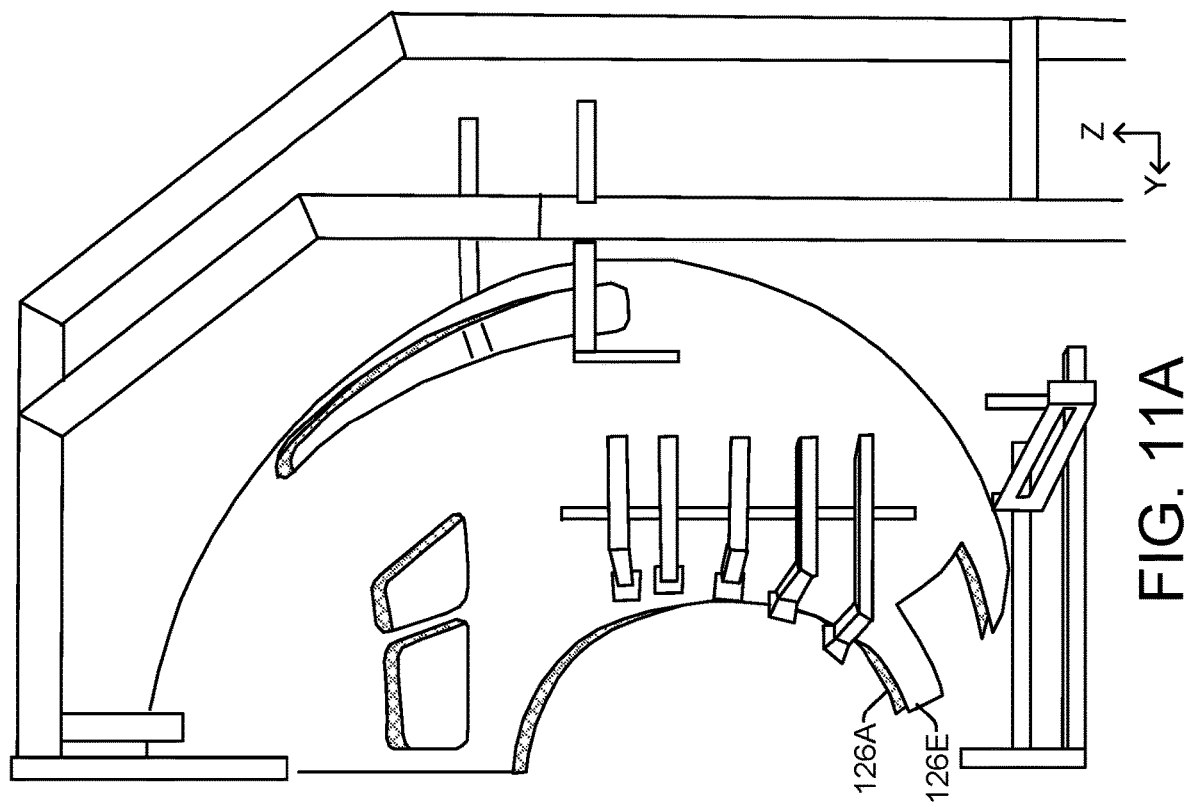
Figure 12A:
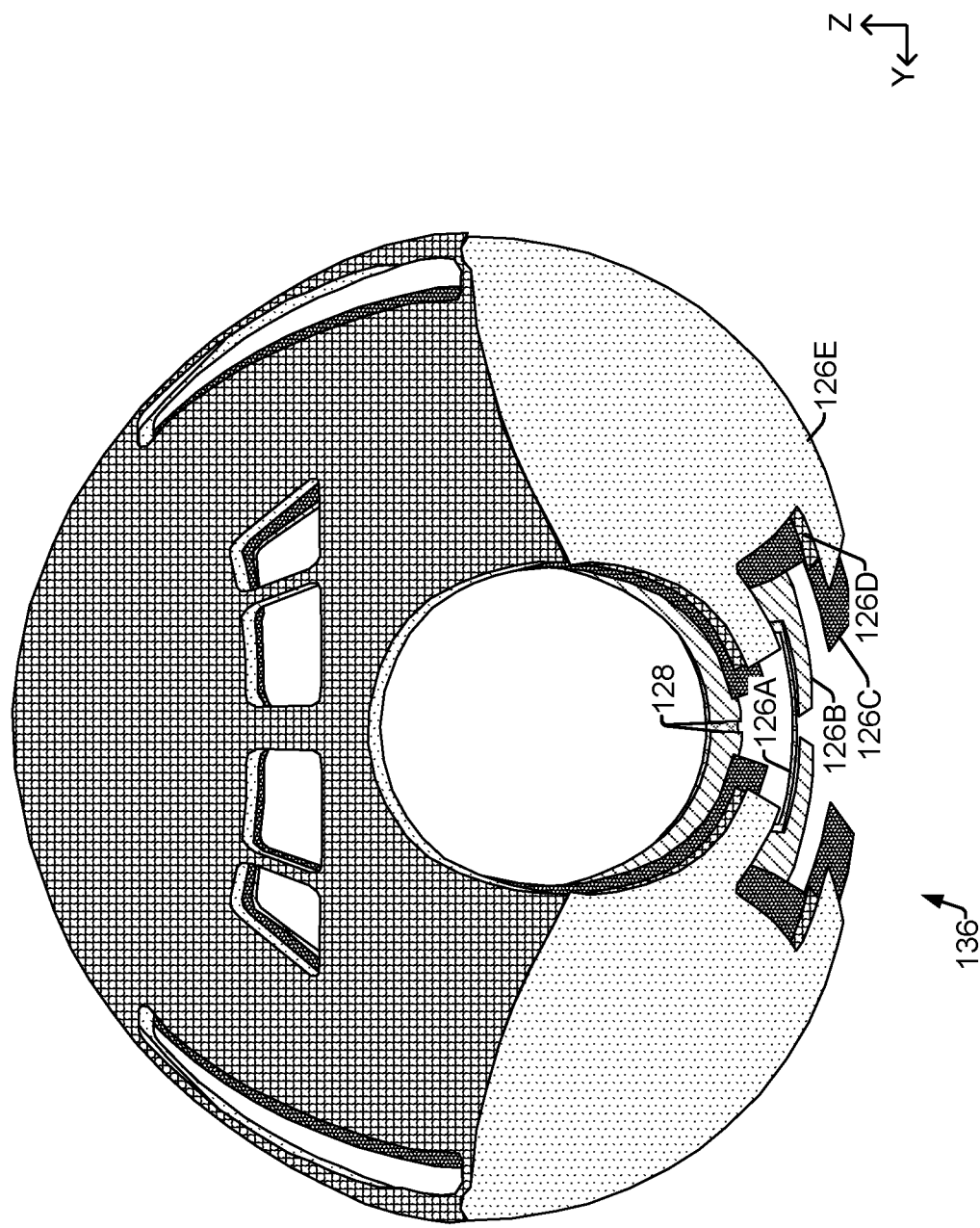
FIGS. 12A, 12B and 12C illustrate a first end view, a second end view, and a cutaway perspective second end view, respectively, of an example of the workpiece of FIG. 1 as deformed during various stages of a demolding process according to a particular implementation.
Figure 12B:
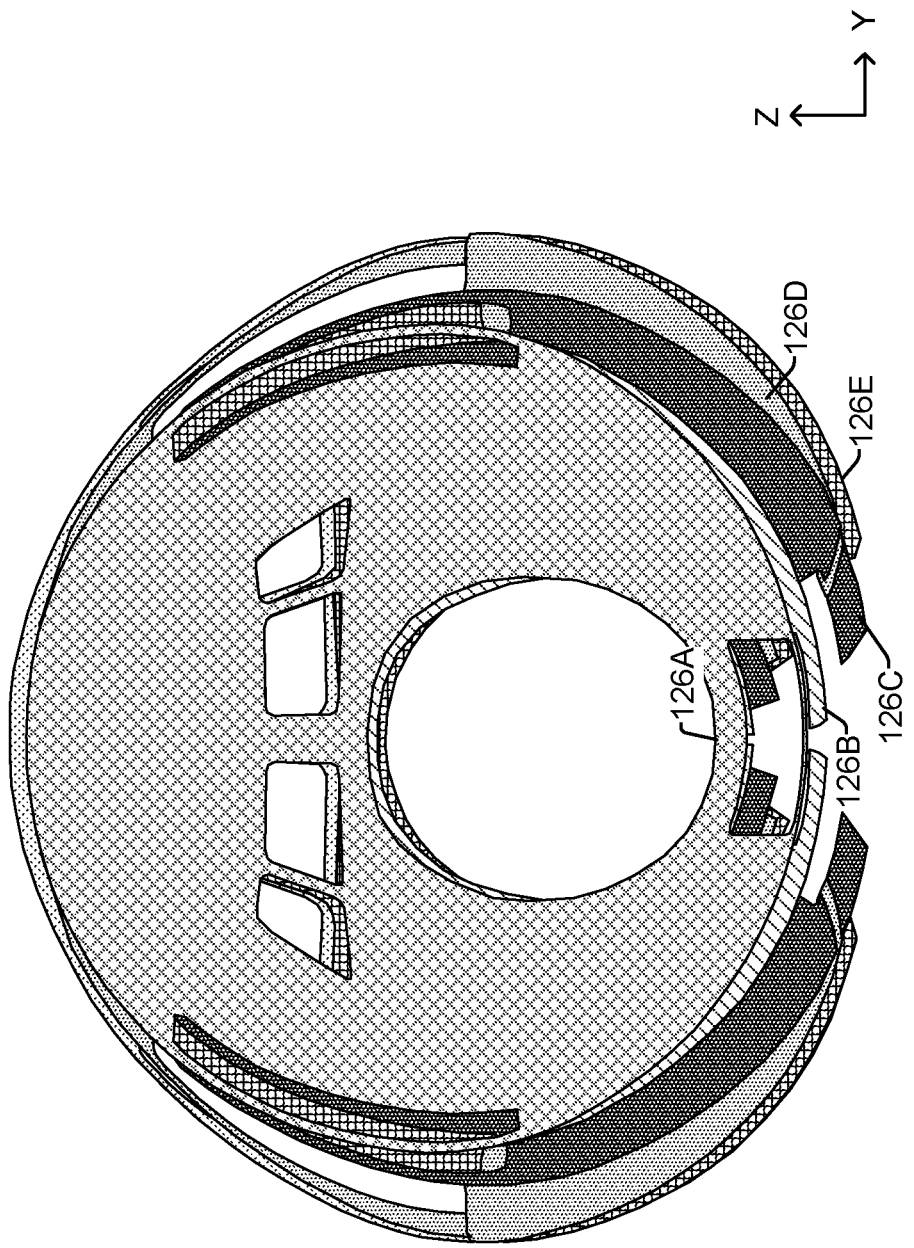
Figure 12C:
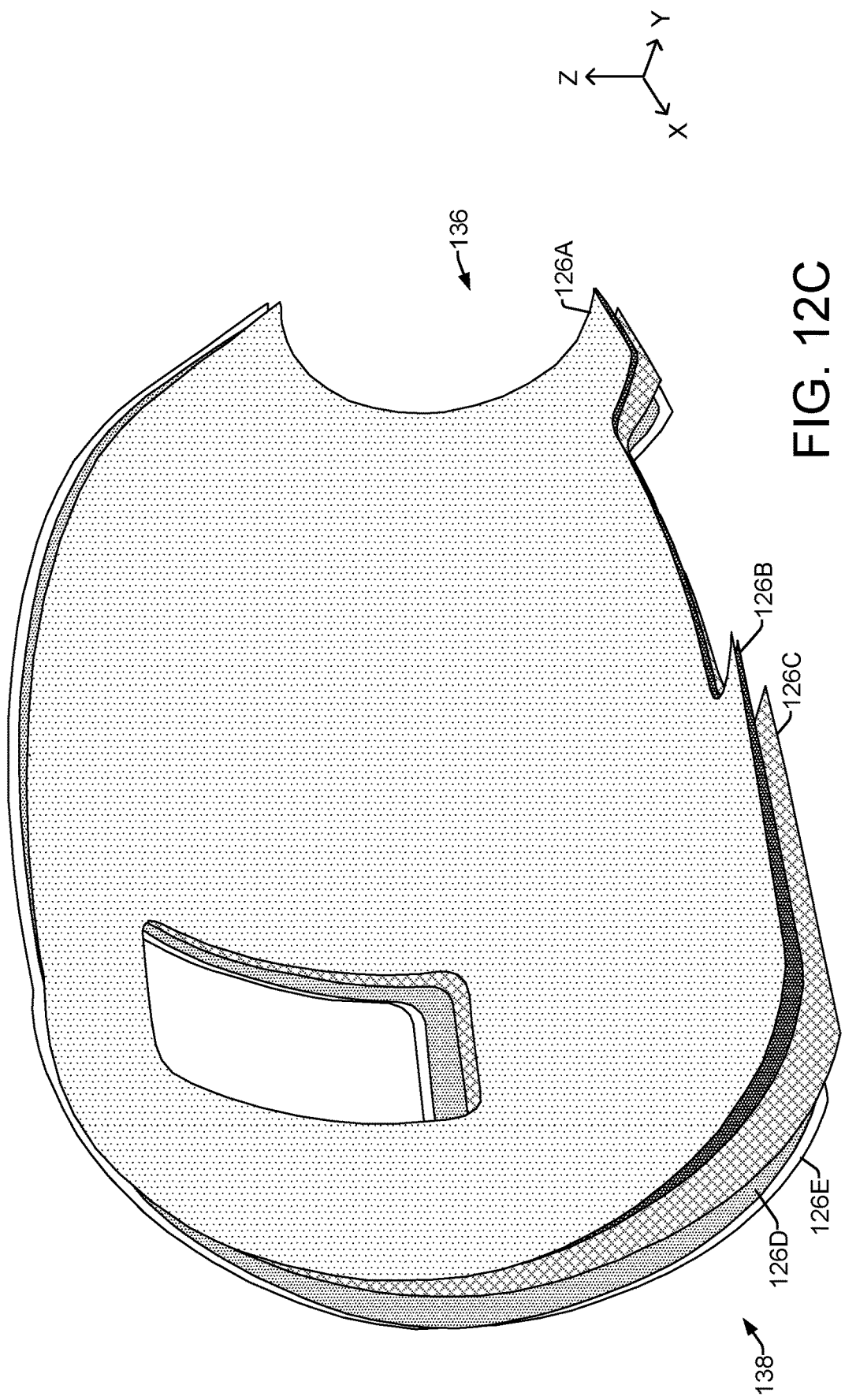

FIGS. 12A, 12B and 12C illustrate a first end view, a second end view, and a cutaway perspective second end view, respectively, of an example of the workpiece 120 as deformed during various stages of the demolding process of FIGS. 8A-11B. For example, in FIGS. 12A-12C, the skin 126 is shown in five configurations. A first configuration of the skin 126A illustrates a shape of the workpiece 120 while the workpiece 120 is on the mandrel 110 and before the workpiece 120 is cut. A second configuration of the skin 126B illustrates a shape of the workpiece 120 while the workpiece 120 is on the mandrel 110 and after the workpiece 120 is cut and the cut edges 128 are allowed to sag apart. The first configuration of the skin 126A and the second configuration of the skin 126B are also illustrated in FIGS. 8A and 8B.

FIGS. 12A-12C also illustrate a third configuration of the skin 126C which illustrates a shape of the workpiece 120 after the first plurality of actuators 160 apply first forces to the first end 136 of the workpiece 120 to at least partially disengage the first end 136 of the workpiece 120 from the first end 136 of the mandrel 110. The second configuration of the skin 126B and the third configuration of the skin 126C are also illustrated in FIGS. 9A and 9B.

FIGS. 12A-12C also illustrate a fourth configuration of the skin 126D which illustrates a shape of the workpiece 120 after the second plurality of actuators 170 apply second forces to the second end 138 of the workpiece 120 (or between the first plurality of couplers 140 and the second end 138) to at least partially disengage the second end 138 of the workpiece 120 from the second end 138 of the mandrel 110. The third configuration of the skin 126C and the fourth configuration of the skin 126D are also illustrated in FIGS. 10A and 10B.

FIGS. 12A-12C also illustrate a fifth configuration of the skin 126E which illustrates a shape of the workpiece 120 after the workpiece 120 is fully disengaged from the mandrel 110 and retained by the demolding tool 130. The fourth configuration of the skin 126D and the fifth configuration of the skin 126E are also illustrated in FIGS. 11A and 11B.

The order of the stages of the demolding process of FIGS. 8A-12C have been shown by modeling to result in deformations of the workpiece 120 that are within manufacturing and structural limitations of the workpiece 120. For example, the order in which the forces are applied in the example of FIGS. 8A-12C inhibits movement of the workpiece 120 toward the first end 136, which could subject ends of the stringers 124 to excessive contact pressure with the stringer troughs 114.

Figure 13:
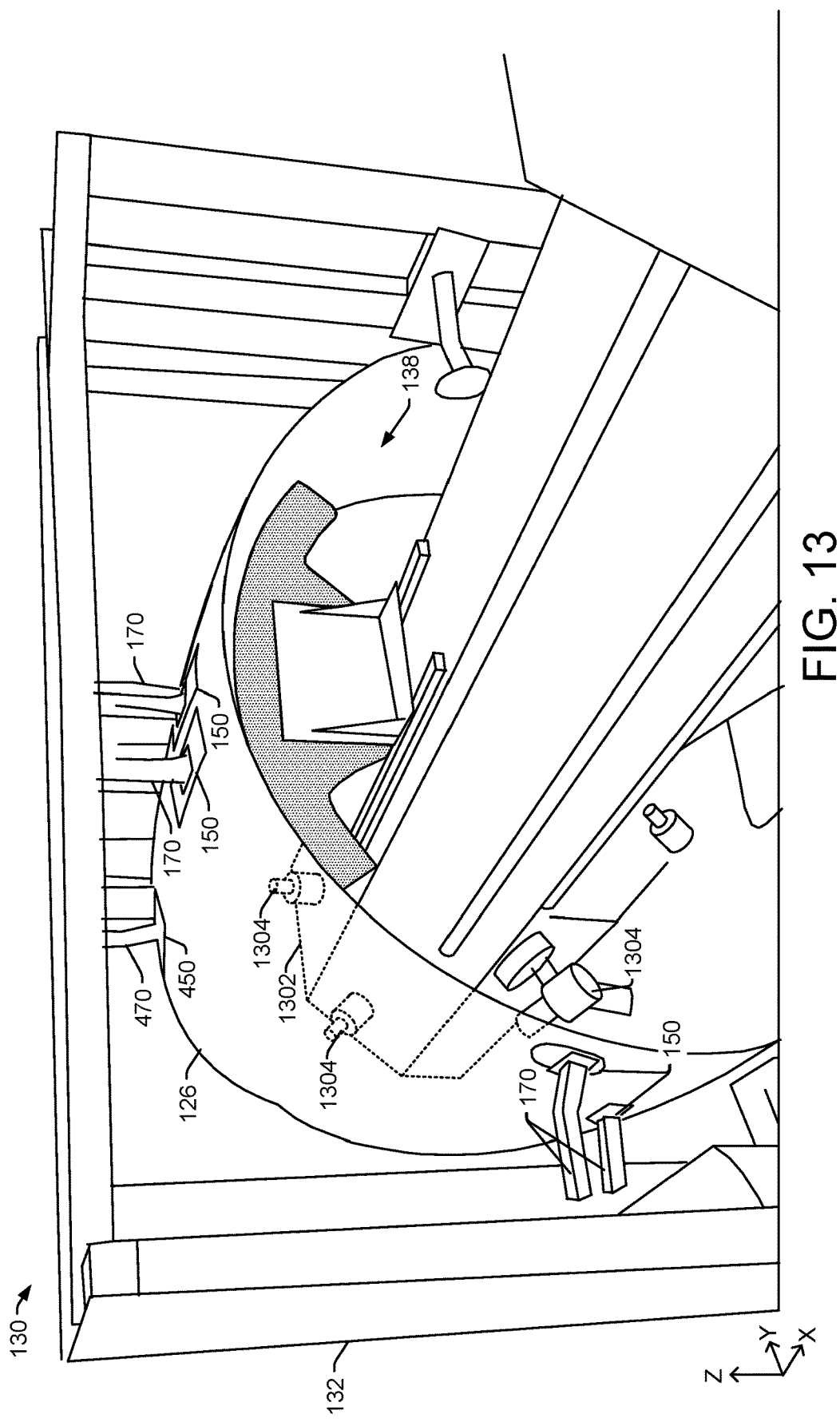
FIG. 13 illustrate a perspective view of an example of a post-processing fixture disposed within the workpiece of FIG. 1 after the mandrel has been removed and while the demolding tool is retaining the workpiece according to a particular implementation.

FIG. 13 illustrate a perspective view of an example of a post-processing fixture 1302 disposed within the workpiece 120 after the mandrel 110 has been removed and while the workpiece 120 is retained by the demolding tool 130 according to a particular implementation. In the example illustrated in FIG. 13, the post-processing fixture 1302 includes or is coupled to one or more post-processing tools 1304. For example, the post-processing tool(s) 1304 may include non-destructive inspection tools that facilitate inspection of an interior surface of the workpiece 120, through inspection of the workpiece walls, or both. To illustrate, the non-destructive inspection tools can include laser measurement tools to measure interior dimensions of the workpiece 120 or cameras to check for surface defects. In some implementations, non-destructive inspection tools on the post-processing fixtures 1302 interact with non-destructive inspection tools external to the workpiece 120 to gather data. To illustrate, ultrasound emitters or an x-ray source may be mounted to the post-processing fixture 1302 to generate signals that are detected by detectors outside the workpiece 120 for gathering non-destructive inspection data about the skin 126, the stringers 124, or both. In other examples, the post-processing tool(s) 1304 may include surface finishing equipment, such as painters, drills, cutters, or polishers. The post-processing tool(s) 1304 can include any tool that facilitates preparation of the workpiece 120 for subsequent manufacturing steps.

Figure 14:
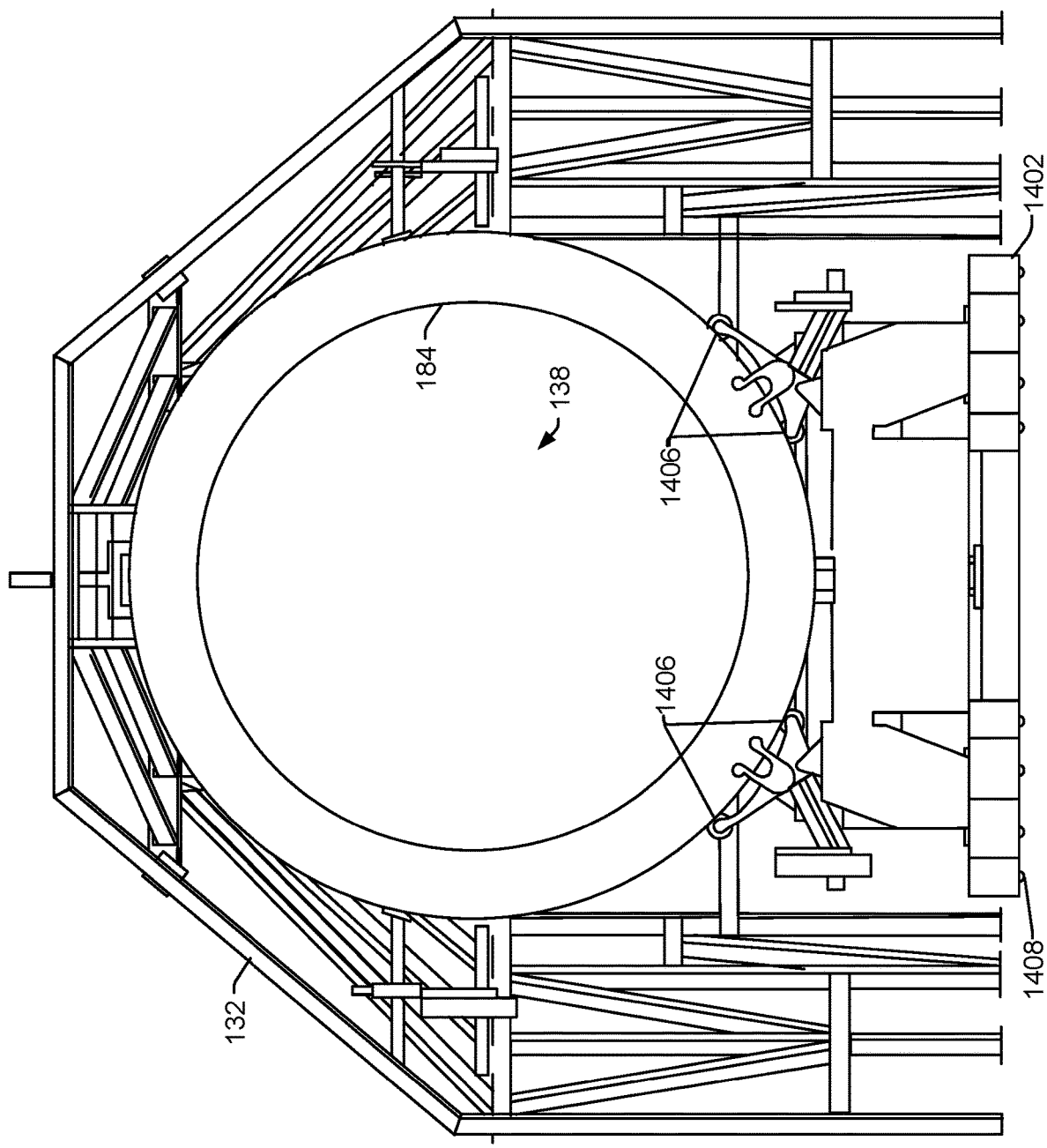
FIG. 14 illustrate an end view of an example of a ring fixture coupled to the workpiece of FIG. 1 after the mandrel has been removed and while the demolding tool is retaining the workpiece according to a particular implementation.
Figure 15:
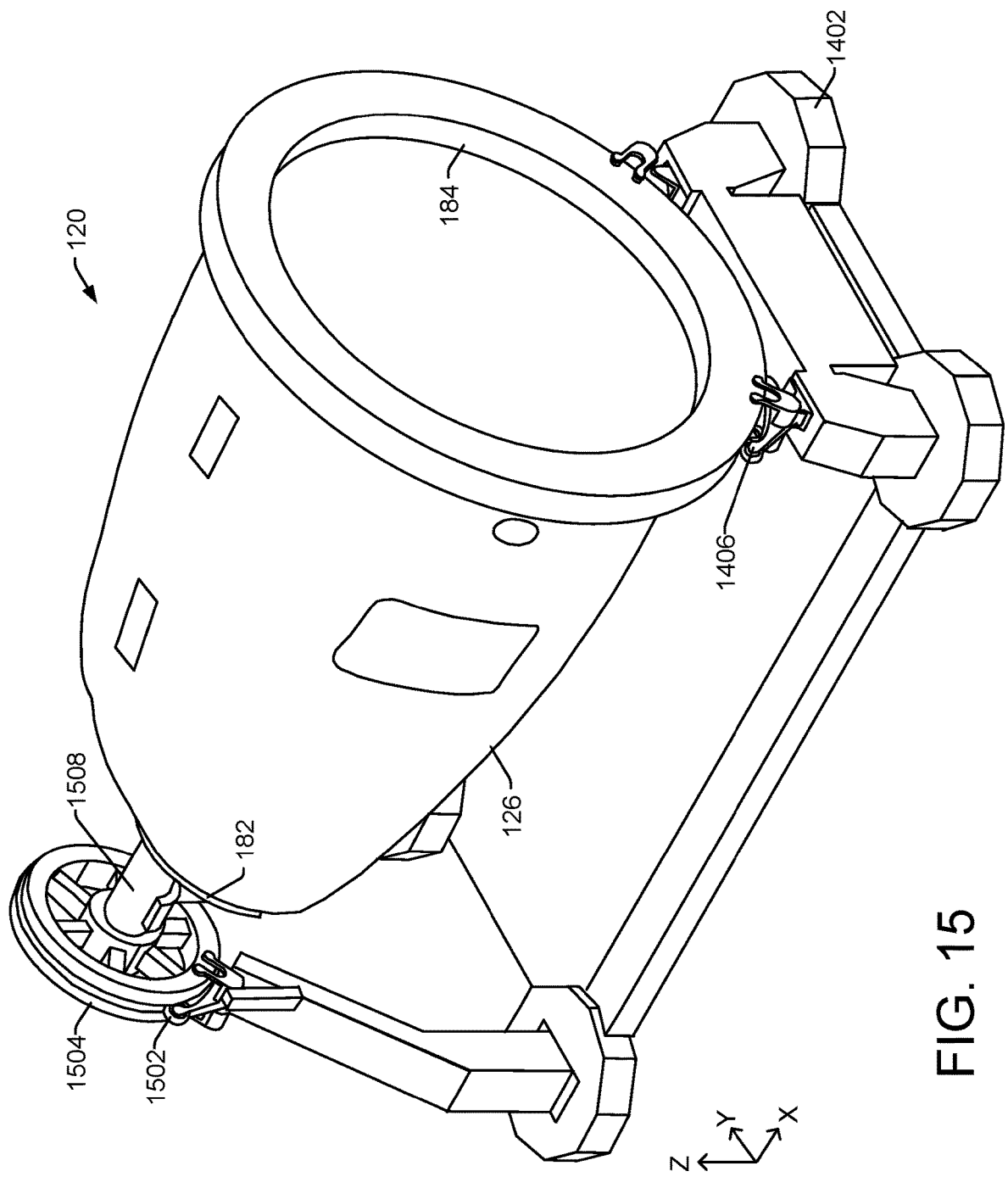
FIG. 15 illustrate a perspective view of an example of a ring fixture coupled to the workpiece of FIG. 1 after the workpiece has been removed from the demolding tool according to a particular implementation.

FIG. 14 illustrate an end view of an example of a ring fixture 1402 coupled to the workpiece of FIG. 1 after the mandrel 110 has been removed and while the workpiece 120 is disposed with the demolding tool 130 according to a particular implementation. FIG. 15 illustrate a perspective view of an example of the ring fixture 1402 coupled to the workpiece 120 after the workpiece 120 has been removed from the demolding tool 130 according to a particular implementation.

In the example illustrated in FIGS. 14 and 15, the ring fixture 1402 includes a plurality of support rings, including the first support ring 182 and the second support ring 184. In the example illustrated in FIG. 14, the ring fixture 1402 also includes a first set of rollers 1408 to enable movement of the ring fixture 1402 relative to the frame structure 132 of the demolding tool 130.

In some implementations, the ring fixture 1402 includes a second set of rollers 1406 and a third set of rollers 1502 (shown in FIG. 15) to enable rotation of the workpiece 120 while the workpiece 120 is supported by the ring fixture 1402. In the example illustrated in FIG. 15, the third set of rollers 1502 directly supports a third support ring 1504, which is coupled via an axle 1508 to the first support ring 182.

In addition to supporting the weight of the workpiece 120 on the ring fixture 1402, the support rings 182, 184 retain the shape of the workpiece 120. For example, the support rings 182, 184 attach to the workpiece 120 such that the cut edges 128 of the workpiece 120 are positioned to be spliced together (e.g., touching or nearly touching each other).

FIG. 16A illustrate a bottom exterior view of the workpiece 120 and indicates a cut line 1602 used for the demolding process according to a particular implementation. Cutting along the cut line 1602 separates the skin 126 at the cut edges 128A and 128B. After the demolding process, the cut edges 128 are reattached to one another using a splice joint. FIG. 16B illustrate an interior view of the workpiece 120 at the cut line 1602.

FIG. 16B shows details of a splice used to join the cut edges 128 together according to a particular implementation. In FIG. 16B, a splice fitting 1604 is coupled to a rib 1606 on an interior surface of the workpiece 120 to join the cut edges 128 together. In some implementations, the rib 1606 is formed in the same manner as the stringers 124. For example, the rib 1606 may include laminate material that is disposed in a rib forming feature (e.g., a channel) in the surface of the mandrel 110 during layup and is subsequently cured with the layers of laminate material 122 of the skin 126 to form the workpiece 120. In other implementations, the rib 1606 is attached to the interior surface of the workpiece 120 during post-processing of the workpiece 120. After the splice joint is complete, the workpiece 120 is ready for subsequent processing, such as assembly with one or more other components to manufacture a fuselage or other structure of an aircraft.

Particular aspects of the disclosure are described in the following set of interrelated clauses.

According to Clause 1, a demolding tool comprises a first plurality of couplers arranged to couple to a first end of a workpiece disposed on a mandrel, the mandrel having a first end disposed adjacent to the first end of the workpiece and having a second end disposed adjacent to a second end of the workpiece, wherein the first end of the mandrel has a first cross-sectional area that is smaller than a second cross-sectional area of the second end of the mandrel; a first plurality of actuators, each actuator of the first plurality of actuators coupled to at least one of the first plurality of couplers; a second plurality of couplers arranged to couple to the workpiece at locations between the first end of the workpiece and the second end of the workpiece; a second plurality of actuators, each actuator of the second plurality of actuators coupled to at least one of the second plurality of couplers; and a controller configured to, after a cut is formed in the workpiece along a longitudinal direction between the first end and the second end of the workpiece: cause the first plurality of actuators to apply, via the first plurality of couplers, first forces to the workpiece to deform the workpiece and at least partially disengage the first end of the workpiece from the first end of the mandrel; and after causing the first plurality of actuators to apply the first forces to the workpiece, cause the second plurality of actuators to apply, via the second plurality of couplers, second forces to the workpiece to further deform the workpiece and at least partially disengage the second end of the workpiece from the mandrel.

Clause 2 includes the demolding tool of Clause 1, wherein the workpiece comprises layers of laminate material cured on the mandrel to define a skin having a shape corresponding to a shape of the mandrel.

Clause 3 includes the demolding tool of Clause 1 or Clause 2, wherein the mandrel defines a plurality of stringer troughs and the workpiece further comprises a plurality of stringers coupled to the skin and cured within the plurality of stringer troughs.

Clause 4 includes the demolding tool of Clause 3, wherein the plurality of stringer troughs converge toward the first end of the mandrel.

Clause 5 includes the demolding tool of Clause 3 or Clause 4, wherein the controller is further configured to, before causing the first plurality of actuators to apply the first forces, cause the first plurality of actuators to pre-tension the first plurality of couplers with respect to the workpiece to inhibit movement of ends of the stringers towards ends of the stringer troughs.

Clause 6 includes the demolding tool of any of Clauses 3 to 5, wherein each of the first plurality of couplers is positioned to couple to the workpiece at a location radially overlying a respective stringer of the plurality of stringers.

Clause 7 includes the demolding tool of any of Clauses 1 to 6, wherein one or more of the first plurality of couplers includes a suction cup or vacuum coupler.

Clause 8 includes the demolding tool of any of Clauses 1 to 7, wherein the first plurality of actuators and the first plurality of couplers are configured to apply forces having components along at least three orthogonal axes to the workpiece, and wherein the second plurality of actuators and the second plurality of couplers are configured to apply forces having components along at least two of the three orthogonal axes of the workpiece.

Clause 9 includes the demolding tool of any of Clauses 1 to 8, wherein the workpiece corresponds to a section of a structure of an aircraft.

Clause 10 includes the demolding tool of any of Clauses 1 to 9, further comprising a frame structure coupled to the first plurality of actuators and the second plurality of actuators.

Clause 11 describes a method of removing from a mandrel a workpiece having a tubular shape defining a plurality of unequal circumferences spaced apart along a longitudinal axis, the method comprising: after the workpiece is cured on the mandrel, cutting the workpiece along a direction between a first end of the workpiece and a second end of the workpiece, wherein the first end of the workpiece has a first circumference that is smaller than a second circumference of the second end of the workpiece; applying first forces to the first end of the workpiece to deform the first end of the workpiece to at least partially disengage the first end of the workpiece from the first end of the mandrel; and after applying the first forces, applying second forces to the second end of the workpiece to further deform the workpiece and at least partially disengage the second end of the workpiece from the mandrel.

Clause 12 includes the method of Clause 11, wherein the first forces are applied after at least a portion of the workpiece separates from the mandrel due to sag at cut edges of the workpiece.

Clause 13 includes the method of either Clause 11 or Clause 12, further comprising, before applying the first forces, pre-tensioning actuators coupled to the workpiece to inhibit movement of the workpiece toward the first end of the mandrel.

Clause 14 includes the method of any of Clauses 11 to 13, further comprising, after applying the second forces, applying third forces to the workpiece to cause vertical displacement of the workpiece relative to the mandrel.

Clause 15 includes the method of any of Clauses 11 to 14, further comprising, after fully disengaging the workpiece from the mandrel, removing the mandrel from within the workpiece by moving the mandrel, the workpiece, or both, relative to the longitudinal axis.

Clause 16 includes the method of Clause 15, wherein the mandrel comprises a support coupled to the first end of the mandrel and wherein the support moves between cut edges of the workpiece during removal of the mandrel from within the workpiece.

Clause 17 includes the method of either Clause 15 or Clause 16, further comprising, after removing the mandrel from within the workpiece, coupling a first support ring to the first end of the workpiece and coupling a second support ring to the second end of the workpiece.

Clause 18 includes the method of any of Clauses 15 to 17, further comprising, after removing the mandrel from within the workpiece, splicing cut edges of the workpiece together.

Clause 19 includes the method of any of Clauses 11 to 18, wherein the first forces have components along a lateral axis, a vertical axis, and the longitudinal axis, and wherein the second forces have components along the lateral axis and the vertical axis.

According to Clause 20 a system comprises: a mandrel contoured to define a tapering tubular shape of a workpiece cured on the mandrel; and a demolding tool configured to remove the workpiece from the mandrel after the workpiece is cured on the mandrel and cut longitudinally, wherein the demolding tool is configured to remove the workpiece from the mandrel by deforming a first end of the workpiece to at least partially disengage the first end of the workpiece from a first end of the mandrel, and subsequently, deforming a second end of the workpiece to at least partially disengage the second end of the workpiece from a second end of the mandrel, wherein the first end of the workpiece has a first cross-sectional area that is smaller than a second cross-sectional area of the second end of the workpiece.

Clause 21 includes the system of Clause 20, wherein the demolding tool comprises: a first plurality of couplers arranged to couple to a first end of the workpiece; a first plurality of actuators, each actuator of the first plurality of actuators coupled to at least one of the first plurality of couplers; a second plurality of couplers arranged to couple to the workpiece at locations between the first end of the workpiece and the second end of the workpiece; and a second plurality of actuators, each actuator of the second plurality of actuators coupled to at least one of the second plurality of couplers.

Clause 22 describes a method of removing a workpiece from a mandrel, the method comprising: applying forces to the workpiece while cutting the workpiece along a longitudinal direction between a first end of the workpiece and a second end of the workpiece; after cutting the workpiece, applying forces to disengage a first end of the workpiece from the mandrel; and disengaging the first end of the workpiece from the mandrel, applying forces to the second end of the workpiece to deform the workpiece and disengage the second end of the workpiece from the mandrel.

Clause 23 includes the method of Clause 22, further comprising, after disengaging the second end of the workpiece from the mandrel, applying forces to the workpiece to cause vertical displacement of the workpiece relative to the mandrel.

Clause 24 includes the method of either Clause 22 or Clause 23, further comprising, after fully disengaging the workpiece from the mandrel, removing the mandrel from within the workpiece by moving the mandrel, the workpiece, or both, relative to the longitudinal direction.

In some implementations, a non-transitory, computer readable medium stores instructions that, when executed by one or more processors, cause the one or more processors to initiate, perform, or control operations to perform part or all of the functionality described above. For example, the instructions may be executable to implement one or more of the operations or methods of FIG. 2. In some implementations, part or all of one or more of the operations or methods of FIG. 2 may be initiated, performed, or controlled by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method of removing from a mandrel a workpiece having a tubular shape defining a plurality of unequal circumferences spaced apart along a longitudinal axis, the method comprising:
after the workpiece is cured on the mandrel, cutting the workpiece along a direction between a first end of the workpiece and a second end of the workpiece using a cutting tool configured to cut the workpiece along a single cut line, wherein the first end of the workpiece has a first circumference that is smaller than a second circumference of the second end of the workpiece;
applying, via a demolding tool, first forces to the first end of the workpiece to deform the first end of the workpiece to at least partially disengage the first end of the workpiece from a first end of the mandrel, wherein the demolding tool comprises a first particular coupler arranged to couple to a side of the workpiece opposite of the single cut line; and
after applying the first forces, applying second forces, via the demolding tool, to the second end of the workpiece to further deform the workpiece and at least partially disengage the second end of the workpiece from the mandrel.

2. The method of claim 1, wherein the first forces are applied after at least a portion of the workpiece separates from the mandrel due to sag at cut edges of the workpiece.

3. The method of claim 1, further comprising, before applying the first forces, pre-tensioning actuators coupled to the workpiece to inhibit movement of the workpiece toward the first end of the mandrel.

4. The method of claim 1, further comprising, after applying the second forces, applying third forces to the workpiece to cause vertical displacement of the workpiece relative to the mandrel.

5. The method of claim 1, further comprising, after fully disengaging the workpiece from the mandrel, removing the mandrel from within the workpiece by moving the mandrel, the workpiece, or both, relative to the longitudinal axis.

6. The method of claim 5, wherein the mandrel comprises a support coupled to the first end of the mandrel and wherein the support moves between cut edges of the workpiece during removal of the mandrel from within the workpiece.

7. The method of claim 5, further comprising, after removing the mandrel from within the workpiece, coupling a first support ring to the first end of the workpiece and coupling a second support ring to the second end of the workpiece.

8. The method of claim 5, further comprising, after removing the mandrel from within the workpiece, splicing cut edges of the workpiece together.

9. The method of claim 1, wherein the first forces have components along a lateral axis, a vertical axis, and the longitudinal axis, and wherein the second forces have components along the lateral axis and the vertical axis.

10. A method of removing a workpiece from a mandrel, the method comprising:
applying forces to the workpiece while cutting the workpiece along a longitudinal direction between a first end of the workpiece and a second end of the workpiece using a cutting tool configured to cut the workpiece along a single cut line, wherein the first end of the workpiece has a first cross-sectional area that is smaller than a second cross-sectional area of the second end of the workpiece;
after cutting the workpiece, applying forces, via a demolding tool, to disengage the first end of the workpiece from the mandrel, wherein the demolding tool comprises a first particular coupler arranged to couple to a side of the workpiece opposite of the single cut line; and
after disengaging the first end of the workpiece from the mandrel, applying forces, via the demolding tool, to the second end of the workpiece to deform the workpiece and disengage the second end of the workpiece from the mandrel.

11. The method of claim 10, further comprising, after disengaging the second end of the workpiece from the mandrel, applying forces to the workpiece to cause vertical displacement of the workpiece relative to the mandrel.

12. The method of claim 10, further comprising, after fully disengaging the workpiece from the mandrel, removing the mandrel from within the workpiece by moving the mandrel, the workpiece, or both, relative to the longitudinal direction.

13. A system comprising:
a mandrel contoured to define a tapering tubular shape of a workpiece cured on the mandrel;
a cutting tool configured to cut the workpiece along a single cut line; and
a demolding tool configured to remove the workpiece from the mandrel after the workpiece is cured on the mandrel and cut longitudinally, wherein the demolding tool is configured to remove the workpiece from the mandrel by deforming a first end of the workpiece to at least partially disengage the first end of the workpiece from a first end of the mandrel, and subsequently, deforming a second end of the workpiece to at least partially disengage the second end of the workpiece from a second end of the mandrel, wherein the first end of the workpiece has a first cross-sectional area that is smaller than a second cross-sectional area of the second end of the workpiece, and wherein the demolding tool comprises a first particular coupler arranged to couple to a side of the workpiece opposite of the single cut line.

14. The system of claim 13, wherein the demolding tool comprises:
a first plurality of couplers arranged to couple to the first end of the workpiece;
a first plurality of actuators, each actuator of the first plurality of actuators coupled to at least one of the first plurality of couplers;
a second plurality of couplers arranged to couple to the workpiece at locations between the first end of the workpiece and the second end of the workpiece, wherein the second plurality of couplers includes the first particular coupler; and a second plurality of actuators, each actuator of the second plurality of actuators coupled to at least one of the second plurality of couplers.

15. The system of claim 14, further comprising:

a controller configured to, after the workpiece is cut longitudinally:

cause the first plurality of actuators to apply, via the first plurality of couplers, first forces to the workpiece to deform the workpiece and at least partially disengage the first end of the workpiece from the first end of the mandrel; and after causing the first plurality of actuators to apply the first forces to the workpiece, cause the second plurality of actuators to apply, via the second plurality of couplers, second forces to the workpiece to further deform the workpiece and at least partially disengage the second end of the workpiece from the mandrel.

16. The system of claim 15, wherein the workpiece comprises layers of laminate material cured on the mandrel to define a skin having a shape corresponding to a shape of the mandrel.

17. The system of claim 16, wherein the mandrel defines a plurality of stringer troughs and the workpiece further comprises a plurality of stringers coupled to the skin and cured within the plurality of stringer troughs.

18. The system of claim 17, wherein the plurality of stringer troughs converge toward the first end of the mandrel.

19. The system of claim 17, wherein the controller is further configured to, before causing the first plurality of actuators to apply the first forces, cause the first plurality of actuators to pre-tension the first plurality of couplers with respect to the workpiece to inhibit movement of ends of the stringers towards ends of the stringer troughs.

20. The system of claim 17, wherein each of the first plurality of couplers is positioned to couple to the workpiece at a location radially overlying a respective stringer of the plurality of stringers.

21. The system of claim 15, wherein one or more of the first plurality of couplers includes a suction cup or vacuum coupler.

22. The system of claim 14, wherein the first plurality of actuators and the first plurality of couplers are configured to apply forces having components along at least three orthogonal axes to the workpiece, and wherein the second plurality of actuators and the second plurality of couplers are configured to apply forces having components along at least two of the at least three orthogonal axes to the workpiece.

23. The system of claim 14, further comprising a third plurality of couplers arranged to couple to the second end of the workpiece, wherein the first plurality of couplers includes a first number of couplers, wherein the second plurality of couplers includes a second number of couplers, and wherein the first number of couplers is greater than the second number of couplers.

24. The system of claim 14, further comprising a frame structure coupled to the first plurality of actuators and the second plurality of actuators.

* * * * *